(12) United States Patent
Dong

(10) Patent No.: US 12,199,764 B2
(45) Date of Patent: Jan. 14, 2025

(54) QUALITATIVE COMMUNICATION USING ADAPTIVE NETWORK CODING WITH A SLIDING WINDOW

(71) Applicant: Huawei Technologies Co., Ltd., Shenzhen (CN)

(72) Inventor: Lijun Dong, San Diego, CA (US)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/330,142

(22) Filed: Jun. 6, 2023

(65) Prior Publication Data
US 2023/0353284 A1  Nov. 2, 2023

Related U.S. Application Data

(63) Continuation of application No. PCT/US2020/065570, filed on Dec. 17, 2020.

(51) Int. Cl.
*H04L 1/00* (2006.01)
(52) U.S. Cl.
CPC ......... *H04L 1/0086* (2013.01); *H04L 1/0076* (2013.01)
(58) Field of Classification Search
CPC ............... H04L 2001/0098; H04L 1/0086
See application file for complete search history.

(56) References Cited

U.S. PATENT DOCUMENTS

| 5,287,374 A | * | 2/1994 | Parr | H04L 27/00 375/343 |
| 5,579,303 A | * | 11/1996 | Kiriyama | H04Q 11/0478 370/252 |
| 6,112,325 A | * | 8/2000 | Burshtein | H04L 1/0046 714/780 |
| 6,182,264 B1 | * | 1/2001 | Ott | H03M 13/15 714/774 |

(Continued)

FOREIGN PATENT DOCUMENTS

WO  2020163124 A1  8/2020

OTHER PUBLICATIONS

Y. Lin, B. Liang and B. Li, "Priority Random Linear Codes in Distributed Storage Systems," in IEEE Transactions on Parallel and Distributed Systems, vol. 20, No. 11, pp. 1653-1667, Nov. 2009.

*Primary Examiner* — Joseph D Torres
(74) *Attorney, Agent, or Firm* — Conley Rose, P.C.

(57) ABSTRACT

A system and a method performed by a source node for communicating data packets in the network comprising dividing a payload for data transmission into a plurality of source chunks with each source chunk comprising a significance level; performing, according to the significance level of each of the plurality of source chunks, adaptive network coding on each source chunk to obtain a plurality of coded chunks in a plurality of coding groups, where a significance level of coded chunks in at least two of the plurality of the coding groups is different, and wherein each coding group of the plurality of coding groups comprises at least one coded (Continued)

chunk having the same first significance level; generating a first coded data packet comprising a header and a payload comprising the plurality of coded chunks; and transmitting the first coded data packet to a destination node.

20 Claims, 10 Drawing Sheets

(56) References Cited

U.S. PATENT DOCUMENTS

| | | | | |
|---|---|---|---|---|
| 6,223,324 B1* | 4/2001 | Sinha | ............... | H04L 1/007 |
| | | | | 714/776 |
| 6,381,215 B1* | 4/2002 | Hamilton | ............... | H04L 1/0002 |
| | | | | 370/236 |
| 6,400,728 B1* | 6/2002 | Ott | ............... | H04L 1/0057 |
| | | | | 370/465 |
| 6,434,718 B1* | 8/2002 | Kawahara | ............... | H04L 1/0059 |
| | | | | 714/776 |
| 6,665,831 B1* | 12/2003 | Yoshida | ............... | H04L 27/2617 |
| | | | | 714/790 |
| 6,757,860 B2* | 6/2004 | Choi | ............... | H04L 1/0041 |
| | | | | 714/701 |
| 6,769,091 B2* | 7/2004 | Classon | ............... | H03M 13/635 |
| | | | | 714/792 |
| 7,133,934 B1* | 11/2006 | Rossello | ............... | H04L 67/561 |
| | | | | 379/900 |
| 7,162,541 B2* | 1/2007 | Koo | ............... | H04L 1/007 |
| | | | | 714/790 |
| 7,178,089 B1* | 2/2007 | Frenger | ............... | H04L 1/0013 |
| | | | | 714/704 |
| 7,251,285 B2* | 7/2007 | Lee | ............... | H04L 1/1841 |
| | | | | 714/790 |
| 7,257,764 B2* | 8/2007 | Suzuki | ............... | H03M 13/114 |
| | | | | 714/776 |
| 7,281,195 B2* | 10/2007 | Murata | ............... | H04L 1/0038 |
| | | | | 714/776 |
| 7,478,309 B2* | 1/2009 | Banba | ............... | H04L 1/0061 |
| | | | | 714/774 |
| 7,613,985 B2* | 11/2009 | Pons | ............... | H04L 1/006 |
| | | | | 714/776 |
| 8,006,168 B2* | 8/2011 | Reznic | ............... | H04L 1/007 |
| | | | | 375/240.2 |
| 8,418,031 B1* | 4/2013 | Yang | ............... | G06F 11/1048 |
| | | | | 714/774 |
| 8,665,967 B2* | 3/2014 | Ngo | ............... | H04N 19/93 |
| | | | | 382/248 |
| 2007/0220404 A1* | 9/2007 | Terui | ............... | H03M 13/356 |
| | | | | 714/774 |

* cited by examiner

QUALITATIVE COMMUNICATION USING ADAPTIVE NETWORK CODING WITH A SLIDING WINDOW

CROSS-REFERENCE OF RELATED APPLICATIONS

This application is a continuation application of International Patent Application No. PCT/US2020/065570 filed on Dec. 17, 2020 by Futurewei Technologies, Inc., and titled "Qualitative Communication Using Adaptive Network Coding with a Sliding Window," which is hereby incorporated by reference in its entirety.

FIELD OF INVENTION

The disclosure relates to the field of network communications. More specifically, this disclosure relates to adaptive network coding with a sliding window to enable effective packet forwarding in a network that implements a packet wash.

BACKGROUND

In traditional routing networks, packets are buffered and forwarded downstream. Any packets received by the routing node are queued by the routing node before it gets scheduled and transmitted towards the destination. The routing node forwards the packet to the destination via intermediate nodes. However, when a network is congested or packet corruption occurs during transmission, the entire packet may be dropped at the intermediate node. Packet loss requires the packet to be retransmitted from the routing node. This causes wasted network resources, reduction in overall throughput, and unpredictable longer delays in transmission of data. Recently, qualitative communication has been proposed for applications that require low latency transmission. Using qualitative communication, a payload in a packet may be broken into multiple chunks of data having semantics or significance. During network congestion or packet corruption, qualitative communication allows a network node to perform a packet wash on the packet where portions of the payload may be discarded without dropping the entire packet. A destination node that receives the packet-washed packet may be able to recover some information from the packet received without having to request that the packet be retransmitted.

SUMMARY

A first aspect relates to a method performed by a source node for communicating data packets in a network. The method includes dividing a payload for a data transmission into a plurality of source chunks, wherein each source chunk of the plurality of source chunks comprises a significance level; performing, according to the significance level of each source chunk of the plurality of source chunks, adaptive network coding on the each source chunk to obtain a plurality of coded chunks in a plurality of coding groups, wherein a significance level of coded chunks in at least two of the plurality of coding groups is different, and wherein each coding group of the plurality of coding groups comprises at least one coded chunk having the same significance level; generating a first coded data packet comprising a header and a payload comprising the plurality of coded chunks; and transmitting the first coded data packet to a destination node.

The method provides a qualitative communication technique using adaptive network coding in fixed and wireless communication networks. The communication network includes a source node, intermediate nodes, and a destination or receiver node. Using adaptive network coding, the source node encodes source chunks/data blocks, based on the significance/priority levels of the source chunks, to obtain coded chunks. Using the significance levels of the source chunks, the source chunks are encoded using coding coefficients to obtain the coded chunks having a significance level. The source node transmits the encoded data packet to a destination node. The encoded data packet includes a payload and a new Internet Protocol (IP) contract block. The payload includes the coded chunks. The new IP contract block includes information about the payload. In an embodiment, coding coefficients may either be sent in the new IP contract block or in the payload. The coding coefficients may be used by the destination node to decode the coded chunks.

An intermediate node receives the encoded data packet and inspects the encoded data packet and/or buffers the encoded data packet. When the intermediate node detects packet corruption in the encoded data packet or network congestion while buffering, the intermediate node may perform a packet wash on the encoded data packet. During a packet wash, the intermediate node uses the significance level of the coded chunks to determine which coded chunks to drop. For instance, the intermediate node drops one or more coded chunks commencing from the least significant coded chunks until a threshold condition is met. After dropping one or more least significant coded chunks, the coded chunks that remain are the most significant coded chunks in a packet-washed data packet. The packet-washed data packet and the coding coefficients are forwarded to the destination node, where it is decoded.

The destination node may decode the coded chunks that are received in the packet-washed data packet based on the coding coefficients. In some instances, the destination node cannot decode one or more coded chunks (referred to herein as "undecoded" chunks) in the packet washed data packet. Based on the undecoded chunks, the destination node may determine the missing coded chunks in the packet-washed data packet using the Internet Protocol (IP) contract block. The destination node may send an acknowledgment packet to the source node after determining the missing coded chunks. The acknowledgement packet may include another IP contract block to enable the source node to determine the coded chunks that were missing from the packet-washed data packet. Using the IP contract block, coded source chunks may be transmitted to the destination node in a sliding window of a payload of an encoded data packet instead of having to retransmit the entire encoded data packet. The benefit of using adaptive network coding with a sliding window is that the intermediate node does not have to determine which coded chunks to drop during a network condition. Rather, the intermediate node uses the significance level of the coded chunks. Further, the source node may quickly determine the dropped coded chunks from a new IP contract block in an acknowledgement packet. The dropped coded chunks may be used to determine the source chunks that are to be encoded and transmitted in a subsequent encoded data packet. The source node may transmit the subsequent encoded data packet as replacement coded chunks within a sliding window. The replacement coded chunks are a replacement for the shortage of coded chunks in the packet-washed data packet. Coded source chunks that are transmitted in the subsequent encoded data packet are in a same significance level as the undecoded chunks. Thus, adaptive network coding with sliding window makes efficient use of packet payload, increases network robustness and throughput while decreasing the overall time to disseminate packets through the network. As a practical matter, the qualitative communication technique improves the performance of network nodes in the network and the overall network, which leads to a better user experience when data is transmitted in a network.

Optionally, in any of the preceding aspects, another implementation of the aspect provides obtaining a second plurality of source chunks from the plurality of source chunks that have a same significance level; and encoding the second plurality of source chunks, together, into the plurality of coded chunks.

Optionally, in any of the preceding aspects, another implementation of the aspect provides performing progressive network coding on the second plurality of source chunks in a descending order of significance level of the each source chunk in the second plurality of source chunks.

Optionally, in any of the preceding aspects, another implementation of the aspect provides performing stacked network coding on source chunks in the second plurality of source chunks to separately encode the each source chunk in the second plurality of source chunks into a coding group according to the same significance level.

Optionally, in any of the preceding aspects, another implementation of the aspect provides receiving, from the destination node, an acknowledgement packet corresponding to the first coded data packet.

Optionally, in any of the preceding aspects, another implementation of the aspect provides the acknowledgement packet comprises an Internet Protocol (IP) contract field.

Optionally, in any of the preceding aspects, another implementation of the aspect provides the acknowledgement packet comprises a field indicating a number of coded chunks from the plurality of coded chunks that are missing at the destination node from the first coded data packet and a significance level field indicating a significance level for the number of coded chunks missing from the first coded data packet.

Optionally, in any of the preceding aspects, another implementation of the aspect provides the acknowledgement packet comprises a received number of chunks field indicating a number of coded chunks from the plurality of coded chunks received at the destination node.

Optionally, in any of the preceding aspects, another implementation of the aspect provides performing, according to a significance level of a second plurality of source chunks, adaptive network coding on the second plurality of source chunks to obtain a second plurality of coded chunks responsive to receiving the acknowledgement packet, wherein a significance level of the second plurality of source chunks is the same significance level of coded chunks that are missing at the destination node from the first coded data packet; generating a second coded data packet comprising a second payload comprising the second plurality of coded chunks and at least one coded chunk from a new coding group; and transmitting, to the destination node, the second coded data packet.

Optionally, in any of the preceding aspects, another implementation of the aspect provides the plurality of coding groups in the payload are arranged from highest significance level to lowest significance level.

Optionally, in any of the preceding aspects, another implementation of the aspect provides the first coded packet comprises a number of coded chunks in each significance level field that indicates a quantity of coded chunks in the payload having the same significance level.

Optionally, in any of the preceding aspects, another implementation of the aspect provides performing adaptive network coding on the plurality of source chunk within a significance level to obtain one or more redundant coded chunks.

A second aspect relates to a method performed by a destination node for communicating data packets in a network. The method includes receiving, from a source node, a first coded data packet comprising a header and a payload comprising a plurality of coded chunks in a plurality of coding groups, wherein each coding group of the plurality of coding groups comprises at least one coded chunk of the plurality of coded chunks having a same significance level, and wherein a significance level of coded chunks in at least two of the plurality of coding groups is different; determining whether at least one of the plurality of coded chunks was dropped in the first coded data packet during transmission of the first coded data packet from the source node; and transmitting, to the source node, an acknowledgement packet responsive to determining that at least one of the plurality of coded chunks was dropped in the first coded data packet during the transmission of the first coded data packet from the source node.

The method provides a qualitative communication technique using adaptive network coding in fixed and wireless communication networks. The communication network includes a source node, intermediate nodes, and a destination or receiver node. Using adaptive network coding, the source node encodes source chunks/data blocks, based on the significance/priority levels of the source chunks, to obtain coded chunks. Using the significance levels of the source chunks, the source chunks are encoded using coding coefficients to obtain the coded chunks having a significance level. The source node transmits the encoded data packet to a destination node. The encoded data packet includes a payload and a new Internet Protocol (IP) contract block. The payload includes the coded chunks. The new IP contract block includes information about the payload. In an embodiment, coding coefficients may either be sent in the new IP contract block or in the payload. The coding coefficients may be used by the destination node to decode the coded chunks.

An intermediate node receives the encoded data packet and inspects the encoded data packet and/or buffers the encoded data packet. When the intermediate node detects packet corruption in the encoded data packet or network congestion while buffering, the intermediate node may perform a packet wash on the encoded data packet. During a packet wash, the intermediate node uses the significance level of the coded chunks to determine which coded chunks to drop. For instance, the intermediate node drops one or more coded chunks commencing from the least significant coded chunks until a threshold condition is met. After dropping one or more least significant coded chunks, the coded chunks that remain are the most significant coded chunks in a packet-washed data packet. The packet-washed data packet and the coding coefficients are forwarded to the destination node, where it is decoded.

The destination node may decode the coded chunks that are received in the packet-washed data packet based on the coding coefficients. In some instances, the destination node cannot decode one or more undecoded chunks in the packet washed data packet. Based on the undecoded chunks, the destination node may determine the missing coded chunks in the packet-washed data packet using the Internet Protocol (IP) contract block. The destination node may send an acknowledgment packet to the source node after determining the missing coded chunks. The acknowledgement packet may include another IP contract block to enable the source node to determine the coded chunks that were missing from the packet-washed data packet instead of having to retransmit the entire encoded data packet. The source node may transmit coded chunks within a sliding window of a payload of a next encoded data packet. The benefit of using adaptive network coding with sliding window is that the intermediate node does not have to determine which coded chunks to drop during a network condition. Rather, the intermediate node uses the significance level of the coded chunks. Further, the source node may quickly determine the dropped coded chunks from a new IP contract block in an acknowledgement packet. The dropped coded chunks may be used to determine the source chunks that are to be encoded and transmitted in a subsequent encoded data packet. The source node may transmit the subsequent encoded data packet as replacement coded chunks within a sliding window. The replacement coded chunks are a replacement for the shortage of coded chunks in the packet-washed data packet. Coded source chunks that are transmitted in a subsequent encoded data packet are in a same significance level as the undecoded chunks. Thus, adaptive network coding with sliding window makes efficient use of packet payload, increases network robustness and throughput while decreasing the overall time to disseminate packets through the network. As a practical matter, the qualitative communication technique improves the performance of network nodes in the network and the overall network, which leads to a better user experience when data is transmitted in a network.

Optionally, in any of the preceding aspects, another implementation of the aspect provides that the acknowledgement packet comprises an Internet Protocol (IP) contract field.

Optionally, in any of the preceding aspects, another implementation of the aspect provides the acknowledgement packet comprises a field indicating a number of coded chunks from the plurality of coded chunks missing from the first coded data packet and a significance level field indicating a significance level for the number of coded chunks missing from the first coded data packet.

Optionally, in any of the preceding aspects, another implementation of the aspect provides the IP contract field comprises a received number of chunks field indicating a number of coded chunks from the plurality of coded chunks that are received at the destination node.

Optionally, in any of the preceding aspects, another implementation of the aspect provides receiving, from the source node, a second coded data packet comprising a second payload responsive to sending the acknowledgement packet, wherein the second payload comprises a second plurality of coded chunks in a same significance level of coded chunks that was dropped in the first coded data packet.

Optionally, in any of the preceding aspects, another implementation of the aspect provides the plurality of coding groups in the payload are arranged from highest significance level to lowest significance level 1.

Optionally, in any of the preceding aspects, another implementation of the aspect provides the first coded data packet comprises a number of coded chunks in each significance level field that indicates a quantity of coded chunks in the payload having the same significance level.

A third aspect relates to a source node in a network. The source node includes a memory storing instructions, and a processor configured to execute the instructions that cause the processor to be configured to divide a payload for a data transmission into a plurality of source chunks, wherein each source chunk of the plurality of source chunks comprises a significance level; perform, according to the significance level of each source chunk of the plurality of source chunks, adaptive network coding on the each source chunk to obtain a plurality of coded chunks in a plurality of coding groups, wherein a significance level of coded chunks in at least two of the plurality of coding groups is different, and wherein each coding group of the plurality of coding groups comprises at least one coded chunk having the same significance level; generate a first coded data packet comprising a header and a payload comprising the plurality of coded chunks; and transmit the first coded data packet to a destination node.

Optionally, in any of the preceding aspects, another implementation of the aspect provides the instructions further cause the processor to obtain a second plurality of source chunks from the plurality of source chunks that have a same significance level; and encode the second plurality of source chunks, together, into the plurality of coded chunks.

Optionally, in any of the preceding aspects, another implementation of the aspect provides the instructions further cause the processor to perform progressive network coding on the second plurality of source chunks in a descending order of significance level of the each source chunk in the second plurality of source chunks.

Optionally, in any of the preceding aspects, another implementation of the aspect provides the instructions further cause the processor to perform stacked network coding on source chunks in the second plurality of source chunks to separately encode the each source chunk in the second plurality of source chunks into a coding group according to the same significance level.

Optionally, in any of the preceding aspects, another implementation of the aspect provides the instructions further cause the processor to receive, from the destination node, an acknowledgement packet corresponding to the first coded data packet.

Optionally, in any of the preceding aspects, another implementation of the aspect provides the acknowledgement packet comprises an Internet Protocol (IP) contract field.

Optionally, in any of the preceding aspects, another implementation of the aspect provides the acknowledgement packet comprises a field indicating a number of coded chunks from the plurality of coded chunks missing from the first coded data packet and a significance level field indicating a significance level for the number of coded chunks missing from the first coded data packet.

Optionally, in any of the preceding aspects, another implementation of the aspect provides the acknowledgement packet comprises a number of coded chunks in each significance level field that indicates a quantity of coded chunks in the payload having the same significance level.

Optionally, in any of the preceding aspects, another implementation of the aspect provides the instructions further cause the processor to perform, according to a significance level of a second plurality of source chunks, adaptive network coding on the second plurality of source chunks to obtain a second plurality of coded chunks responsive to receiving the acknowledgement packet, wherein a significance level of the second plurality of source chunks is the same significance level of coded chunks that are missing at the destination node from the first coded data packet; generate a second coded data packet comprising a second payload comprising the second plurality of coded chunks and at least one coded chunk from a new coding group; and transmit, to the destination node, the second coded data packet.

Optionally, in any of the preceding aspects, another implementation of the aspect provides the plurality of coding groups in the payload are arranged from highest significance level to lowest significance level.

Optionally, in any of the preceding aspects, another implementation of the aspect provides the first coded packet comprises a number of coded chunks in each significance level field that indicates a quantity of coded chunks in the payload having the same significance level.

Optionally, in any of the preceding aspects, another implementation of the aspect provides the instructions further cause the processor to perform adaptive network coding on at least one additional source chunk in a significance level to obtain one or more redundant coded chunks.

A fourth aspect relates to a destination node in a network. The destination node includes a memory storing instructions, and a processor configured to execute the instructions that cause the processor to be configured to receive, from a source node, a first coded data packet comprising a header and a payload comprising a plurality of coded chunks in a plurality of coding groups, wherein each coding group of the plurality of coding groups comprises at least one coded chunk of the plurality of coded chunks having a same significance level, and wherein a significance level of coded chunks in at least two of the plurality of coding groups is different; determine whether at least one of the plurality of coded chunks was dropped in the first coded data packet during transmission of the first coded data packet from the source node; and transmit, to the source node, an acknowledgement packet responsive to determining that at least one of the plurality of coded chunks was dropped in the first coded data packet during the transmission of the first coded data packet from the source node.

Optionally, in any of the preceding aspects, another implementation of the aspect provides the acknowledgement packet comprises an Internet Protocol (IP) contract field.

Optionally, in any of the preceding aspects, another implementation of the aspect provides the acknowledgement packet comprises a field indicating a number of coded chunks from the plurality of coded chunks missing from the first coded data packet and a significance level field indicating a significance level for the number of coded chunks missing from the first coded data packet.

Optionally, in any of the preceding aspects, another implementation of the aspect provides the IP contract field comprises a received number of chunks field indicating a number of coded chunks from the plurality of coded chunks that are received at the destination node.

Optionally, in any of the preceding aspects, another implementation of the aspect provides the instructions further cause the processor to receive, from the source node, a second coded data packet comprising a second payload responsive to sending the acknowledgement packet, wherein the second payload comprises a second plurality of coded chunks window in a same significance level of coded chunks that was dropped in the first coded data packet.

Optionally, in any of the preceding aspects, another implementation of the aspect provides the plurality of coding groups in the payload are arranged from highest significance level to lowest significance level.

Optionally, in any of the preceding aspects, another implementation of the aspect provides the first coded data packet comprises a number of coded chunks in each significance level field that indicates a quantity of coded chunks in the payload having the same significance level.

A fifth aspect relates to non-transitory computer-readable medium. The non-transitory computer-readable medium is configured to store a computer program product comprising computer executable instructions that, when executed by a processor of a source node implemented in a network, cause the processor to execute the method of any one of the first aspects.

A sixth aspect relates to non-transitory computer-readable medium. The non-transitory computer-readable medium is configured to store a computer program product comprising computer executable instructions that, when executed by a processor of a destination node implemented in a network, cause the processor to execute the method of any one of the second aspects.

A seventh aspect relates to a system in a network. The system includes a first network node configured to encode a data packet using coding coefficients to obtain an encoded data packet and transmit the encoded data packet over the network; and a second network node coupled to the first network node and configured to receive the encoded data packet, and wherein the first network node is configured to execute the method of any one of the first aspects.

An eighth aspect relates to a system in a network. The system includes a first network node configured to encode a data packet using coding coefficients to obtain an encoded data packet and transmit the encoded data packet over the network; and a second network node coupled to the first network node and configured to receive the encoded data packet, and wherein the second network node is configured to execute the method of any one of the second aspects.

For the purpose of clarity, any one of the foregoing embodiments may be combined with any one or more of the other foregoing embodiments to create a new embodiment within the scope of the disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
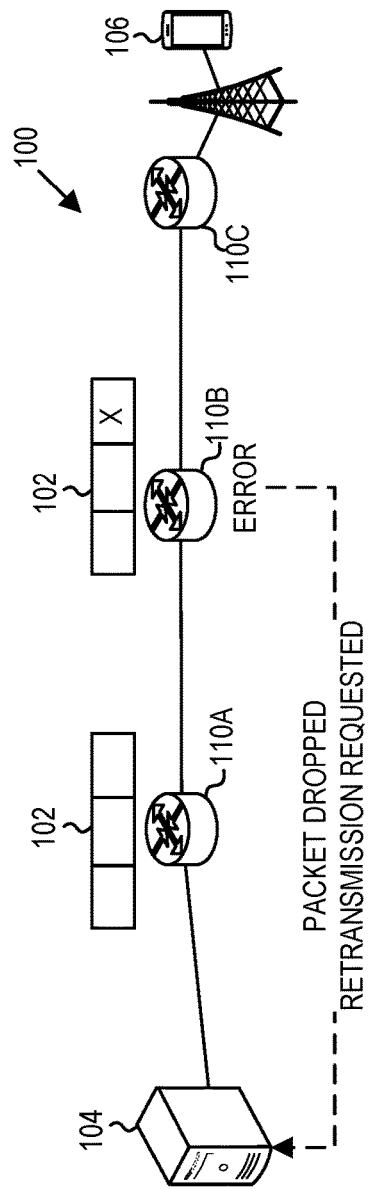
FIG. 1 is a schematic diagram illustrating a data packet transmission being dropped due to packet corruption.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

As noted above, a routing node transmits a data packet to a destination node over a communication network. As intermediate nodes in the network receive the data packet, the intermediate nodes buffer the data packet before it gets scheduled and transmitted. However, when the network is congested or the data packet has a packet error/corruption, the data packet is dropped at an intermediate node, which causes packet loss. Packet loss requires the data packet to be retransmitted from the source as the probability of cache matching to a particular dropped data packet in the intermediate nodes is very low. Retransmitting the data packet causes wasted network resources, reduction in overall throughput, and unpredictably longer delays in transmission of data.

Disclosed herein is a qualitative communication technique using adaptive network coding in fixed or wireless communication networks. Using adaptive network coding, a source node encodes source chunks/blocks of data, based on the significance/priority levels of the source chunks, to obtain coded chunks/blocks. The source chunks are encoded using coding coefficients to obtain the coded chunks having a significance level. The source node transmits the encoded data packet, which includes a payload and a new IP contract block, to a destination node. In embodiments, the new IP contract block may include the coding coefficients or the payload may include the coding coefficients.

An intermediate node in the network may receive the encoded data packet and buffers the encoded data packet. When the intermediate node detects packet corruption in the encoded data packet or network congestion while buffering, the intermediate node may perform a packet wash on the encoded data packet. As used in the disclosure, packet wash is a scrubbing operation on the encoded data packet that drops at least one coded chunk in the encoded data packet. By performing packet wash on the encoded data packet, a size of the encoded data packet is reduced while preserving the remaining information in the encoded data packet. In order to preserve the most important information, the intermediate node may not discard coded chunks of higher significance levels, may not discard a header, and/or may not discard other fields in the encoded data packet. During a packet wash, the intermediate node uses the significance level of the coded chunks to determine coded chunks to drop. For instance, the intermediate node may drop one or more coded chunks commencing from the least significant coded chunks until a threshold condition is met. After dropping one or more least significant coded chunks, the coded chunks that remain are the most significant coded chunks in a packet-washed data packet. The packet-washed data packet and other data such as the coding coefficients are then forwarded to the destination node.

The destination node may decode the coded chunks that are received based on the coding coefficients. In an embodiment, the destination node may not be able to decode coded chunks in a significance level where one or more other coded chunks within the same significance level were dropped during packet wash. The coded chunks that are not able to be decoded may be referred to as undecoded chunks in the present disclosure. The destination node may also send an acknowledgement to the source node in the form of an acknowledgment packet after the packet-washed data packet is received. The acknowledgement packet may include a new IP contract block. In an embodiment, the new IP contract block indicates the coded chunks that were missing/dropped in the packet-washed data packet and their significance level. In another embodiment, the new IP contract block indicates a number of coded chunks received in the packet-washed data packet. In an embodiment, the new IP contract block may indicate the significance level of the undecoded chunks. Similar data can also be included in other acknowledgement packets that do not include new IP contract blocks. The source node may use the IP contract block (or other information) to determine the number of source chunks at the significance level of the undecoded chunks in a packet-washed data packet that are needed to be encoded and subsequently transmitted to the destination node in order to decode the undecoded chunks. In an embodiment, the source chunks needed to be encoded can be encoded and subsequently transmitted to the destination node with other new source chunks at a new significance level that have been encoded in a sliding window of an encoded data packet. In an embodiment, the source chunks are associated with undecoded chunks that were not acknowledged (or not decoded) by the destination node in the previous transmission. A sliding window is a set of data that contains source chunks for encoding in a subsequent encoded data packet. The source chunks for encoding in the subsequent encoded data packet may be part of a group for which more coded chunks are still needed at the destination for decoding the undecoded chunks in the packet washed data packet. The coded source chunks that are needed for decoding the undecoded chunks are in the same significance level of undecoded chunks in the packet washed data packet. Therefore, using the sliding window avoids having to retransmit the entire original encoded data packet during packet loss or network congestion. A benefit of using adaptive network coding with sliding window is that the intermediate node does not have to independently determine which coded chunks to drop during a network condition. Rather, the intermediate node can use the significance level of the coded chunks. Further, the source node may quickly determine the undecoded chunks to transmit in a subsequent data packet with a sliding window using the acknowledgement received from the destination node. Thus, adaptive network coding with sliding window can make efficient use of packet payload, increase network robustness and throughput, and decrease the overall time to disseminate packets through the network.

FIG. 1 is a schematic diagram of a network 100 that illustrates a data packet being dropped due to packet corruption/error. The network 100 may comprise one more wired or wireless/mobile networks that includes network nodes such as, for example, source node 104, intermediate nodes 110A-110C, and destination node 106. In embodiments, the network nodes may be a router, switch, or any other network device. In FIG. 1, a data packet 102 is being transmitted along a transmission/propagation path from the source node 104 to the destination node 106. The transmission path includes intermediate nodes 110A-110C. The intermediate nodes 110A-110C forward the data packet 102 towards the destination node 106. The destination node 106 can be any type of device that is capable of requesting the data packet 102. In the current Internet, the data packet 102 may be completely dropped at the intermediate node 110B when packet corruption occurs during the packet transmission or propagation. The packet corruption is not correctable by using any means (e.g., cyclic redundancy check (CRC)). After the intermediate node 110B drops the data packet 102, the intermediate node 110B sends a request to the source node 104 to retransmit the data packet 102.

Figure 2:
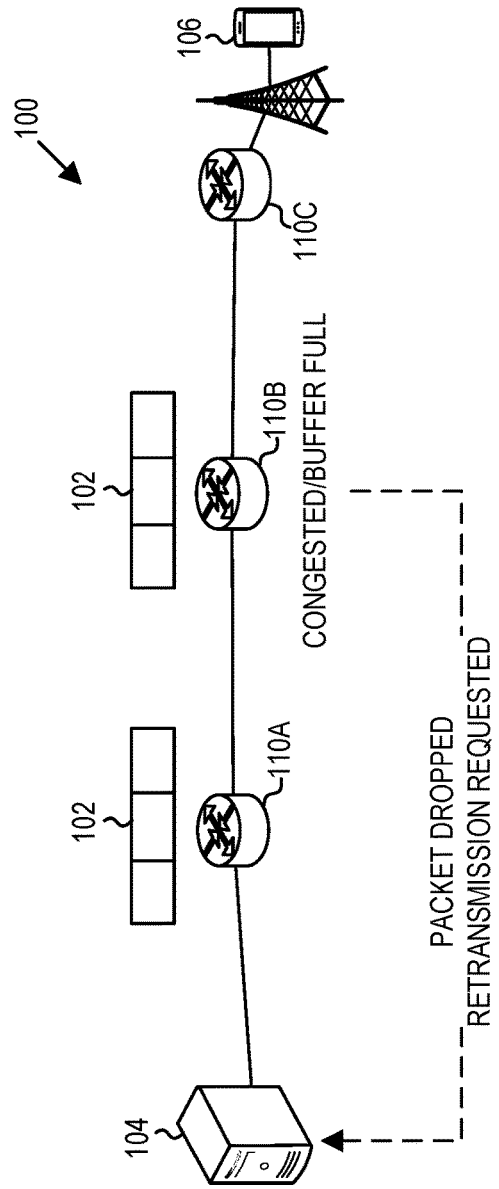
FIG. 2 is a schematic diagram illustrating a data packet transmission being dropped due to a network condition.

Similarly, FIG. 2 is a schematic diagram of a network 100 that illustrates a data packet being dropped due to network congestion. When a buffer at the intermediate node 110B is congested or full, the intermediate node 110B may drop the data packet 102. After the intermediate node 110B drops the data packet 102, the intermediate node 110B sends a request to the source node 104 to retransmit the data packet 102. Other conditions may also cause the data packet 102 to be dropped including, but not limited to, when the size of the data packet 102 is bigger than maximum transmission unit (MTU) of the intermediate node 110C. As shown in FIGS. 1 and 2, when the data packet 102 is dropped by the intermediate node 110B, retransmission of the data packet 102 is needed until the data packet 102 is received and acknowledged by the destination node 106 or the maximum retransmission time is reached. This process wastes network resources, reduces network throughput and causes longer latency. With the emerging use cases such as holographic telepresence, tactile Internet, etc. that require low latency, the disclosure seeks to address the above issues to improve data communications in fixed and wireless networks.

Figure 3:
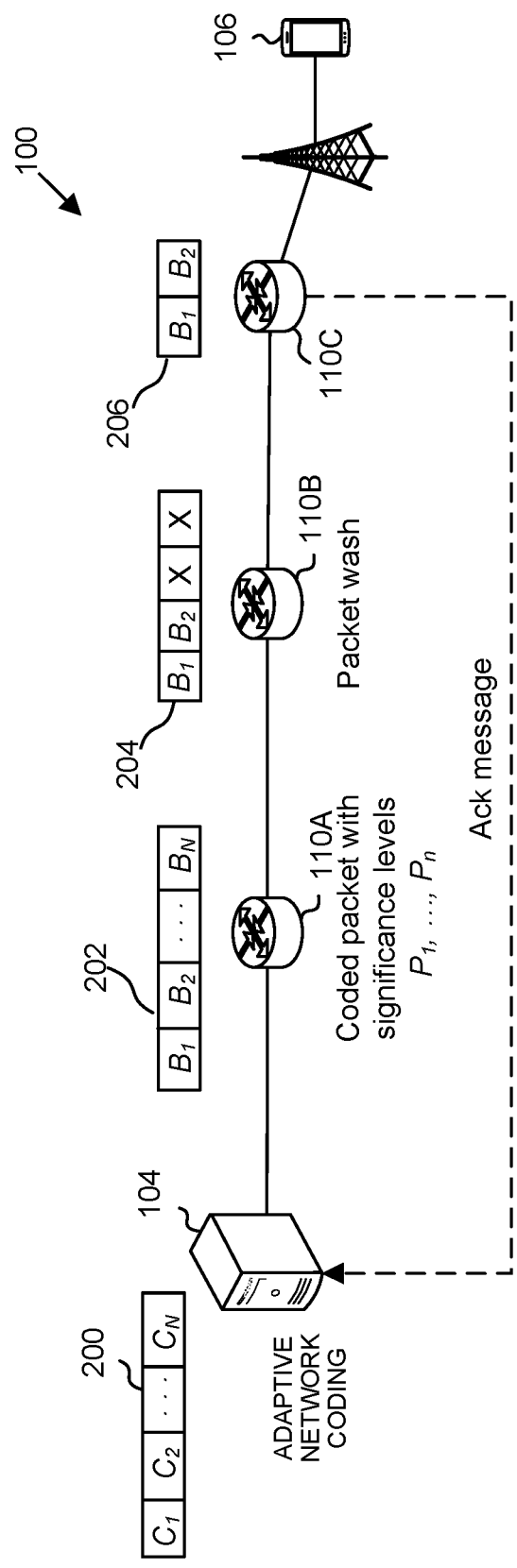
FIG. 3 is a schematic diagram illustrating a data packet transmission in accordance with an embodiment of the disclosure.

FIG. 3 is a schematic diagram illustrating a network 100 that implements a qualitative communication technique using adaptive network coding in accordance with various embodiments of the disclosure. As used herein, qualitative communication uses an encoded data packet 202 with a new IP contract block that carries quality, entropy and/or semantics of the payload. The payload includes coded chunks obtained by adaptive network coding. Adaptive network coding is a coding scheme in which the source chunks are encoded according to their significance levels and transmitted in a packet from a source node 104, and decoded at a destination node 106 so as to increase network throughput, reduce delays, and make the network more robust. With adaptive network coding, source chunks in the information flow are delivered as coded chunks in an encoded data packet 202. Qualitative communication using adaptive network coding may prevent network nodes in the network 100 from dropping the entire encoded data packet 202 when packet corruption or network congestion occurs. Qualitative communication enables the network nodes in the network 100 to selectively drop parts of the encoded data packet 202 to reduce the packet size of the encoded data packet 202. Further, a destination node 106 (or receiver node) that receives a reduced size encoded data packet may be able to decode the most significant parts (for example, coded chunks with the highest significance levels) that remain in the encoded data packet. Advantages of the disclosed embodiments include reduced network resource usage, better prioritization of network resources, and reduced latency of transmitting data in the network 100.

Initially, the source node 104 may obtain a data packet that is to be transmitted to the destination node 106. The source node 104 creates equal sized source chunks 200 (e.g., $C_1, C_2, C_3, \ldots C_N$) of the data to be transmitted in the data packet. Each source chunk 200 is a unit of data (for example, 1 kilobyte) that can be included in a payload of the data packet and has a significance/priority level. In embodiments, one or more of the source chunks 200 may have the same significance level or a different significance level.

The source node 104 may perform adaptive network coding on the source chunks 200 to obtain an encoded data packet 202. In an embodiment, the source node 104 encodes the source chunks 200 with coding coefficients to obtain coded chunks $B_1, B_2, \ldots, B_N$. The coded chunks $B_1, B_2, \ldots, B_N$ have significance levels. In an embodiment, an encoded data packet 202 is created with a packet header and a payload. The coded chunks $B_1, B_2, \ldots, B_N$ are inserted into the payload. The source node 104 may order the coded chunks $B_1, B_2, \ldots, B_N$ in the payload according to the significance levels of the coded chunks $B_1, B_2, \ldots, B_N$. Optionally, the order of the coded chunks in the payload is different than the order of the source chunks 200. In an embodiment, additional source chunks in a significance level may be encoded and transmitted as coded chunks $B_1, B_2, \ldots, B_N$ in the payload in order to add redundancy to the encoded data packet 202. For instance, source chunks within a significance level may be encoded using adaptive network coding to obtain redundant coded chunks, which can be transmitted in the encoded data packet 202, such that if a coded chunk is dropped from the packet in the significance level then the remaining coded chunks might still be able to be decoded. The source chunks may be selected from any significance level of the source chunks 200 for encoding as redundant coded chunks. In one embodiment, source chunks from a lowest significance level instead of source chunks from a higher significance level may be encoded as redundant coded chunks and transmitted. The source node 104 may implement adaptive network coding on the source chunks 200 using either a stacked network coding (SNC) scheme or a progressive network coding (PNC) scheme.

In an embodiment of an SNC scheme, the source chunks 200 are encoded in different coding groups according to the significance levels of the source chunks 200 when generating the coded chunks. Each coding group may have a set of coded chunks/blocks $B_1, B_2, \ldots, B_N$ having the same significance level. Also, the coding groups may have different significance levels. Using the SNC scheme, an $h_{th}$ set of coded chunks/blocks is created into a coding group by encoding all the source chunks 200 in the $h_{th}$ significance level together. The coding group is inserted into a packet payload of an encoded data packet. In SNC, each coded chunk/block $B_i$ is encoded using equation 1:

$$B_i = \sum_{j=d_{h-1}-1}^{d_h} \alpha_{i,j} * C_j \qquad \text{EQ. 1}$$

where $B_i$ is a coded chunk, $C_j$ are the source chunks $C_1$, $C_2$, $C_3, \ldots, C_N$, $\alpha_{i,j}$ are nonzero random coding coefficients uniformly chosen from a Galois field, and $d_h$ is the number of source chunks with the $h_{th}$ significance level. A matrix form of the coding coefficients $\alpha_{i,j}$ for six coded chunks for an $i_{th}$ row and $j_{th}$ column is shown below:

TABLE 1

$$\begin{bmatrix} \alpha_{11} & 0 & 0 & 0 & 0 & 0 \\ 0 & \alpha_{22} & \alpha_{23} & 0 & 0 & 0 \\ 0 & \alpha_{32} & \alpha_{33} & 0 & 0 & 0 \\ 0 & 0 & 0 & \alpha_{44} & \alpha_{45} & \alpha_{46} \\ 0 & 0 & 0 & \alpha_{54} & \alpha_{55} & \alpha_{56} \\ 0 & 0 & 0 & \alpha_{64} & \alpha_{65} & \alpha_{66} \end{bmatrix}$$

where $\alpha_{11}$ is the nonzero random coding coefficient to encode source chunk $C_1$ as the first significance level, $\alpha_{22}$, $\alpha_{23}$, $\alpha_{32}$, and $\alpha_{33}$ are the nonzero random coding coefficients to encode source chunks $C_2$ and $C_3$ as the second significance level, and $\alpha_{44}$, $\alpha_{45}$, $\alpha_{46}$, $\alpha_{54}$, $\alpha_{55}$, $\alpha_{56}$, $\alpha_{64}$, $\alpha_{65}$, and $\alpha_{66}$ are the nonzero random coding coefficients to encode source chunks $C_4$, $C_5$, and $C_6$ as the third significance level. The coding coefficients $\alpha_{11}$-$\alpha_{66}$ in Table 1 are uniformly chosen from a Galois field. In an example of an encoded data packet with 6 source chunks $C_1$, $C_2$, $C_3$, $C_4$, $C_5$, $C_6$ using the SNC scheme, source chunk $C_1$ has significance level $P_1$, source chunks $C_2$, $C_3$ have a relative significance level $P_2$, and source chunks $C_4$, $C_5$, $C_6$ have a relative significance level $P_3$. SNC encodes the source chunks $C_1$, $C_2$, $C_3$, $C_4$, $C_5$, $C_6$ within coding groups according to their relative significance levels $P_1$, $P_2$, and $P_3$. For instance, source chunk C) is encoded as a coded chunk $B_1$ in a coding group with a significance level $P_1$, source chunks $C_2$, $C_3$ are encoded as coded chunks $B_2$, $B_3$ having a significance level $P_2$, and source chunks $C_4$, $C_5$, $C_6$ are encoded as coded chunks $B_1$, $B_2$, $B_3$ in a coding group with a significance level $P_3$. All coded chunks in a coding group have the same relative significance level. In an embodiment, the coding groups have the significance level of their coded chunks and are arranged in order of decreasing significance, $P_1 > P_2 > P_3$, where $P_1$ is the most significant level. In other embodiments, the coding groups are arranged in a reversed order of significance, a random order of significance levels, or any other order of significance level.

In an embodiment of a PNC scheme, the source chunks 200 are encoded progressively in order of descending significance levels to obtain coded chunks with significance levels. In an example, coded chunks of the $h_{th}$ significance level are encoded in coding groups from source chunks 200 between significance levels 1 and h, with level 1 being the most significant level and h being the least significant level. In PNC, each coded chunk $B_i$ is encoded using equation 2:

$$B_i = \sum_{j=1}^{d_h} \alpha_{i,j} * C_j \qquad \text{EQ. 2}$$

where $C_j$ are the source chunks $C_1$, $C_2$, $C_3 \ldots, C_N$, $\alpha_{i,j}$ are nonzero random coding coefficients uniformly chosen from a Galois field, and $d_h$ is a number of blocks/chunks with the $h_{th}$ significance level. A matrix form of the coding coefficients $\alpha_{i,j}$ for six coded chunks for an it row and $j_{th}$ column is shown below:

TABLE 2

$$\begin{bmatrix} \alpha_{11} & 0 & 0 & 0 & 0 & 0 \\ \alpha_{21} & \alpha_{22} & \alpha_{23} & 0 & 0 & 0 \\ \alpha_{31} & \alpha_{32} & \alpha_{33} & 0 & 0 & 0 \\ \alpha_{41} & \alpha_{42} & \alpha_{43} & \alpha_{44} & \alpha_{45} & \alpha_{46} \\ \alpha_{51} & \alpha_{52} & \alpha_{53} & \alpha_{54} & \alpha_{55} & \alpha_{56} \\ \alpha_{61} & \alpha_{62} & \alpha_{63} & \alpha_{64} & \alpha_{65} & \alpha_{66} \end{bmatrix}$$

where $\alpha_{11}$ is a nonzero random coding coefficient to encode source chunk $C_1$ as the first significance level, $\alpha_{21}$, $\alpha_{22}$, $\alpha_{23}$, $\alpha_{31}$, $\alpha_{32}$, and $\alpha_{33}$ are nonzero random coding coefficients to encode source chunks $C_2$ and $C_3$ as the second significance level, $\alpha_{41}$, $\alpha_{42}$, $\alpha_{43}$, $\alpha_{44}$, $\alpha_{45}$, $\alpha_{46}$, $\alpha_{51}$, $\alpha_{52}$, $\alpha_{53}$, $\alpha_{54}$, $\alpha_{55}$, $\alpha_{56}$, $\alpha_{61}$, $\alpha_{62}$, $\alpha_{63}$, $\alpha_{64}$, $\alpha_{65}$, and $\alpha_{66}$ are nonzero random coding coefficients to encode source chunks $C_4$, $C_5$, and $C_6$ the third significance level. The coding coefficients $\alpha_{11}$-$\alpha_{66}$ in Table 2 are uniformly chosen from a Galois field. In an example of an encoded data packet using the PNC scheme with 6 source chunks $C_1$, $C_2$, $C_3$, $C_4$, $C_5$, $C_6$ source chunk $C_1$ has a significance level $P_1$, source chunks $C_2$ and $C_3$ have a relative significance level $P_2$, and source chunks $C_4$, $C_5$, $C_6$ have a relative significance level $P_3$. PNC may encode the source chunks $C_1$, $C_2$, $C_3$, $C_4$, $C_5$, $C_6$ in a same significance level progressively into coded chunks in descending significance level of the source chunks $C_1$, $C_2$, $C_3$, $C_4$, $C_5$, $C_6$. As an example, an $h_{th}$ coded chunk is encoded between significance levels 1 and h from source chunks $C_1$, $C_2$, $C_3$, $C_4$, $C_5, \ldots, C_h$, where the significance level decreases from 1 to h. Coded chunks in the same significance level are encoded into coding groups that has coded chunks of the same significance level.

In an embodiment, coded chunks obtained by adaptive network coding are inserted into a payload of a data packet and a header block is added to create an encoded data packet 202. Also, a new IP contract block may be added to the encoded data packet 202. In embodiments, the encoded data packet 202 may be transmitted without a new IP contract block for implementing a qualitative communication scheme disclosed in the present disclosure. In embodiments, the new IP contract block may be added to a header of the encoded data packet 202 or to a payload of the encoded data packet 202. The new IP contract block may contain information that provides semantics about the payload. In an embodiment, the new IP contract block may include information that specifies the type of adaptive network coding used, size of the coded chunks, number of coded chunks, a significance level of coding groups that have coding chunks of the same relative significance level, or the like. The new IP contract block may include coding coefficients that were used to encode the source chunks 200. In other embodiments, the coding coefficients may be inserted into the payload of the encoded data packet 202. In embodiments, the coded chunks may be obtained using equation 1 or equation 2, shown above. The coding coefficients may be used at the destination node 106 to decode the encoded data packet 202. The header block may contain data that specifies the type of data packet, a source IP address, and a destination IP address of the encoded data packet 202. After obtaining the encoded data packet 202, the source node 104 transmits the encoded data packet 202 towards a destination node 106 on the network 100. It may be understood that the qualitative communication scheme may be implemented with various network packets such as, for example, an IP packet, an Internet Control Message Protocol (ICMP) packet, a User Datagram Protocol (UDP) packet, or other similar network packets, and it need not be implemented with a new IP contract block.

In an embodiment, an intermediate node 110B may receive the encoded data packet 202. The intermediate node 110B may identify a network condition in the network 100 that may call for the intermediate node 110B to perform packet wash on the encoded data packet 202. In embodiments, the network condition may be network congestion in the network 100 or packet corruption of one or more coded chunks of the encoded data packet 202. Packet wash drops/discards one or more coded chunks from the payload of the encoded data packet 202 while preserving higher significance level coded chunks of the encoded data packet 202. Preserving information of the encoded data packet 202 may include not discarding coded chunks of higher significance levels and not discarding the header or the new IP contract block of the encoded data packet 202, to preserve information about the chunks.

In an embodiment, the intermediate node 110B may drop one or more coded chunks during packet wash to obtain a packet-washed data packet 206. The packet-washed data packet 206 is a smaller size of the encoded data packet 202 since only a portion of the coded chunks in the encoded data packet 202 were dropped. The coded chunks dropped from the encoded data packet 202 ("missing/dropped coded chunks") are of a lower significance level than at least some of the coded chunks remaining in the packet-washed data packet 206. In embodiments, coded chunks of a lower significance level are dropped first to obtain the packet-washed data packet 206. During packet wash, coded chunks of a lower significance level are removed first before coded chunks in higher priority significance levels are removed. In an example, with SNC coding, the intermediate node 110B may commence discarding coded chunks from a coding group with the lowest significance level and move to a higher significance level coding group until a threshold condition is met. The threshold condition is a number of coded chunks that have to be dropped by the intermediate node 110B during packet wash in order to meet delivery conditions for forwarding the packet-washed data packet 206 (such as relieving network congestion). After the threshold condition is met, the intermediate node 110B forwards the packet-washed data packet 206 to a downstream intermediate node 110C. In an embodiment, in the $h_{th}$ significance level representing the lowest significance level of the encoded data packet 202, the intermediate node 110B may drop any coded chunks having the $h_{th}$ significance level. Further, the intermediate node 110B may drop any number of coded chunks having the same relative lower significance level until there are no additional coded chunks to drop within the significance level (at which point the node may begin dropping chunks from the next lowest significance level) or the network condition does not exist.

In other embodiments, when a network condition is not detected, the intermediate node 110B may forward the encoded data packet 202 to the downstream intermediate node 110C. Similarly, the intermediate node 110C may determine whether a network condition in the network 100 exists. The intermediate node 110C may drop/discard coded chunks during a packet wash when a network condition exists. Alternatively, the intermediate node 110C may forward the encoded data packet 202 to the destination node 106 when a network condition does not exist.

In an embodiment, the packet-washed data packet 206 may be received at the destination node 106. The destination node 106 may decode the coded chunks that remain in the packet-washed data packet 206 to recreate the original source chunks of data. In some embodiments, the destination node 106 may use the new IP contract block to decode the packet-washed data packet 206. In an example, the destination node 106 may decode the coded chunks remaining in the packet-washed data packet 206 using the coding coefficients in the new IP contract block. In embodiments, the destination node 106 may not be able to decode coded chunks in a coding group in a significance level (referred to as "undecoded chunks") when one or more other coded chunks in the coding group were dropped during packet wash In an embodiment, the destination node 106 may inspect the packet-washed data packet 206 to determine whether one or more coded chunks were dropped from the packet-washed data packet 206. In an embodiment, the destination node 106 may use the new IP contract block to determine whether the packet-washed data packet 206 is missing coded chunks that were not received by the destination node 106. In an embodiment, the destination node 106 may transmit/send an acknowledgement in the form of an acknowledgement packet back to the source node 104 when determining that one or more coded chunks were dropped/missing ("missing coded chunks").

In an embodiment, the acknowledgement packet may include another new IP contract block that the source node uses to determine the missing coded chunks. In embodiments, the other new IP contract block from the destination node 106 may include information that indicates the missing coded chunks and their significance levels in the packet-washed data packet 206 received by the destination node 106. Using the number of missing coded chunks and their significance levels enables the source node to determine the missing degrees of freedom (e.g., missing coded chunks at a significance level) of the packet-washed data packet 206. As discussed throughout the present disclosure, the information can also be provided in other formats, and need not be provided in a new IP contract block.

In an example, during network congestion, the intermediate node 110B may have dropped coded chunks in the least significant level coded chunks. For instance, an encoded data packet 202 may have one coded chunk in significance level one, two coded chunks in significance level two, and three coded chunks in significance level three. During packet wash, the intermediate node 110B drops two coded chunks, whereby the destination node 106 receives four coded chunks in packet-washed data packet 206. The destination node 106 may send an acknowledgement packet to the source node 104 that it received four coded chunks. Using the acknowledgement, the source node 104 may determine that two degrees of freedom (e.g., two coded chunks) were missing in significance level three, while other coded chunks in significance levels one and two were received.

In some embodiments, the acknowledgement packet may not include data about the missing coded chunks when the destination node 106 is able to decode the most significant coded chunks in the packet-washed data packet 206. In an embodiment, the destination node 106 may be able to decode the coded chunks even after a packet wash when redundant coded chunks within one or more significance levels are transmitted in the encoded data packet. The new IP contract block in the acknowledgement packet may specify the significance level of the missing coded chunks and the number of coded chunks that were missing. In another embodiment, the new IP contract block in the acknowledgement packet may include the number of coded chunks that were received in the packet-washed data packet 206.

In an embodiment, the source node 104 may transmit, within a sliding window of a subsequent encoded data packet, replacement coded chunks for decoding the undecoded chunks that were not able to be decoded at the destination node 106. The replacement coded chunks are a replacement for the chunk shortage at the destination node 106. Further, the replacement coded chunks are encoded source chunks in a significance level of the undecoded chunks received at the destination node 106. As used herein, a sliding window is a set of data that contains source chunks for encoding in a subsequent encoded data packet. The source chunks for encoding may be source chunks for the missing coded chunks that are in a same significance level of undecoded chunks in the packet washed data packet 206 that was received at the destination node 106. A sliding window of a subsequent encoded data packet may change as the number of coded chunks are dropped during packet wash in an immediately preceding transmission from the source node 104. For instance, when a smaller number of coded chunks are dropped during packet wash, the packet washed data packet may have a smaller number of undecoded chunks, which causes a smaller number of source chunks ("replacement source chunks") that would be encoded for transmission in a subsequent encoded data packet. So, new source chunks that were not previously encoded and transmitted by the source node 104 may be added to the replacement source chunks for encoding in order to fill the sliding window, such that the subsequent encoded data packet can have a relatively constant size composed of a mix of encoded replacement source chunks and new source chunks. However, if there were no undecoded chunks from a previously transmitted encoded data packet 202, then the number of new source chunks to be included in the sliding window may be equal to the size of the sliding window. In an embodiment, the sliding window may contain coded chunks of the source chunks for the undecoded chunks of the packet-washed data packet 206 that were not decoded by the destination node 106 (i.e., coded chunks that were not acknowledged by the destination node 106).

The use of the sliding window can also enable the source node 104 to transmit a number of coded chunks from a coding group that is insufficient for decoding. For example, if a packet will include only 10 coded chunks, higher significance level coding groups occupy 8 coded chunks in the packet, and the next coding group to be transmitted has 4 coded chunks, then only 2 coded chunks from that coding group will be transmitted (potentially at a lowest significance level in the packet). If no coded chunks are dropped, the sliding window can then indicate that the remaining 2 coded chunks from that coding group can be transmitted (potentially at a highest significance level in the packet). More generally, a coding group's coded chunks can be at a lowest significance level in a first packet, and then at a highest (or higher) significance level in a next or subsequent packet.

Figure 4:
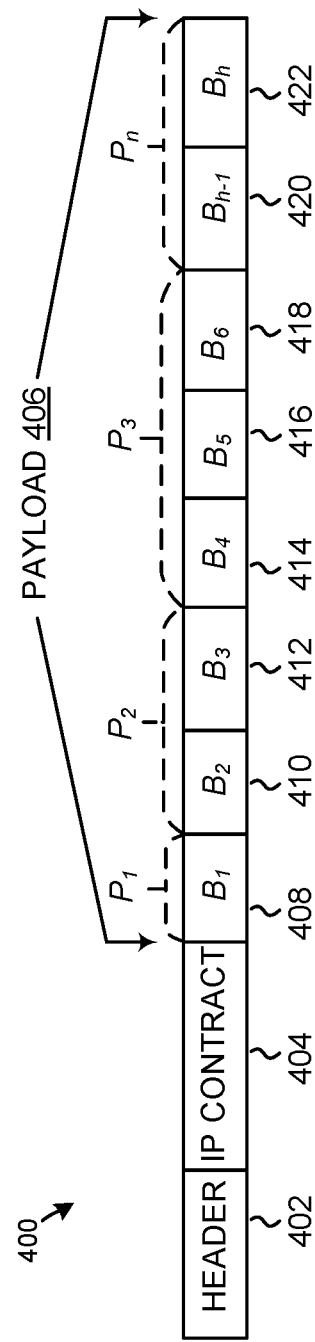
FIG. 4 is a schematic diagram that illustrates adaptive network coding inside a data packet in accordance with an embodiment of the disclosure.

FIG. 4 is a schematic diagram that illustrates an encoded data packet 400 in accordance with embodiments of the disclosure. The encoded data packet 400 can be an example of the encoded data packet 202 from a network node such as, for example, the source node 104 in FIG. 3. The encoded data packet 400 may be obtained by performing adaptive network coding of source chunks of a payload of a data packet. The adaptive network coding may be SNC or PNC, as described above. The encoded data packet 400 includes a header 402, new IP contract block 404, and packet payload 406. The header 402 can contain data that specifies the type of data packet, a source address, and a destination address, and can optionally be an IP header. The new IP contract block 404 may contain information about the packet payload 406 to enable a destination node to identify information about the payload, although this information can optionally be included elsewhere in the packet. In an embodiment, the new IP contract block 404 may include coding coefficients that may be used by the destination node to decode the coded chunks in the packet payload 406. In an embodiment, the packet payload 406 includes coded chunks that were obtained by adaptive network coding. In an embodiment, the payload of the encoded data packet 400 includes h coded chunks ordered according to their significance levels into coding groups. To illustrate, as shown in FIG. 4, coded chunk $B_1$ is in a coding group having significance level $P_1$, coded chunks $B_2$ and $B_3$ are in a coding group with a significance level $P_2$, coded chunks $B_4$, $B_5$ and $B_6$ are in a coding group with a significance level $P_3$, and coded chunks $B_{h-1}$ and $B_h$ are in a coding group with a significance level $P_h$. After adaptive network coding on the source chunks $C_1$, $C_2$, $C_3$, ..., $C_N$ inside the data packet 400, the source node 104 will include the coded chunks 408-422 in the encoded data packet 400, which will have a full rank equal to h. As used herein, full rank h is the number of coded chunks 408-422 that is contained in a full payload 406 of the data packet 400.

Figure 5A:
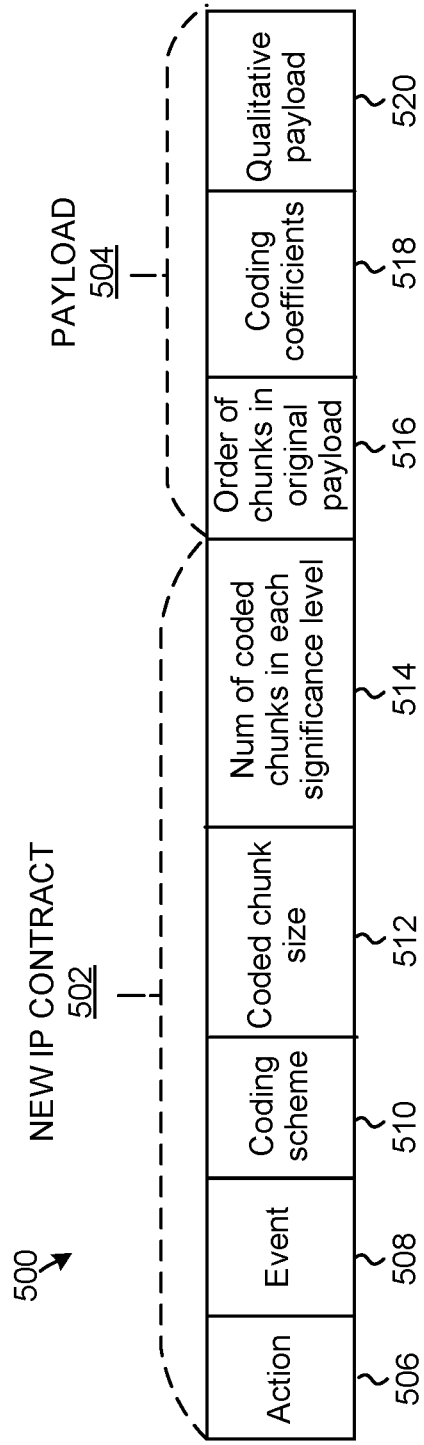
FIG. 5A is a schematic diagram of an encoded data packet with a new internet protocol (IP) contract block in accordance with an embodiment of the disclosure.
Figure 5B:
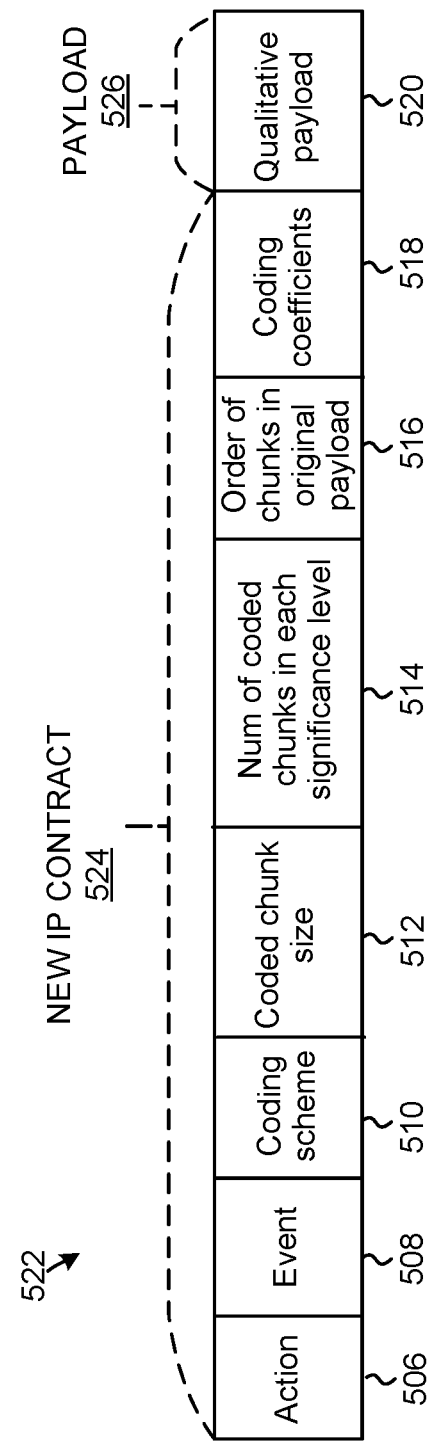
FIG. 5B is a schematic diagram of an encoded data packet with a new IP contract block in accordance with an embodiment of the disclosure.

FIG. 5A is a schematic diagram of an encoded data packet 500 transmitted from a source node, and FIG. 5B is a schematic diagram of another encoded data packet 522 transmitted from a source node in accordance with embodiment of the disclosure. The source node may be source node 104 in FIG. 3. In embodiments, the encoded data packets 500, 522 may be similar to encoded data packet 400 of FIG. 4. In an embodiment, the encoded data packets 500, 522 are shown with a portion of the fields included in the encoded data packet 400 of FIG. 4. It should also be understood that additional data fields can optionally be included in any of packets 400, 500, 522, or other packets described herein.

In an embodiment, FIG. 5A depicts an encoded data packet 500 with a new IP contract block 502 and payload block 504. The new IP contract block 502 includes fields 506, 508, 510, 512, and 514. The payload block 504 includes fields 516, 518, and 520. In this embodiment, the coding coefficients 518 being in the payload 504 may not be visible to an intermediate node, for example, intermediate node 110B in FIGS. 1-3. On the other hand, FIG. 5B depicts an encoded data packet 522 with a new IP contract block 524 and payload block 526. The new IP contract block 524 has a longer length as it includes the coding coefficients 518 and similar fields 506, 508, 510, 512, 514, and 516. The payload block 526 includes field 520, while all other aspects of FIGS. 5A and 5B are the same. In this embodiment, the coding coefficients 518 associated with dropped coded chunks may be removed during packet wash.

In the depicted embodiments of FIGS. 5A and 5B, the fields in encoded data packets 500 and 522 include action field 506, event field 508, coding scheme field 510, coded chunk size field 512, number of coded chunks in each significance level field 514, the order of chunks in original payload field 516, coding coefficients field 518, and payload field 520. The action field 506 may be used by a network node to take an action on the encoded data packet 500 and 522 when a network condition is detected. In an embodiment, the action to take in the action field 506 may be a packet wash. The event field 508 identifies a network condition detected by the network node that triggers the action field 506. In an embodiment, the condition may be network congestion or packet corruption in the network. The coding scheme field 510 includes an indication of the adaptive network coding used inside of payload field 504. The coding scheme field 510 may include SNC or PNC. The coded chunk size field 512 is the size of each of the coded chunks 408 in the payload block 504 or payload block 524 of the encoded data packet 500 and 522. The coded chunk size 512 can be used by a network node to find the coded chunk delincator when packet wash is performed. The number of coded chunks in each significance level 514 identifies the coded chunks 408-422 in the payload that are prioritized by significance level, so that lower priority coded chunks are removed before higher coded chunks when packet wash is performed. To illustrate, as shown in FIG. 4, significance level 1 includes one coded chunk 408 while significance level 2 includes two coded chunks 410 and 412. The order of chunks in original payload 516 indicates the order of source chunks, for instance source chunks $C_1$, $C_2$, $C_3$, . . . , $C_N$ of FIG. 3 of an un-encoded data packet. The coefficients 518 are data that is used to identify and decode the coded chunks in the payload 504. The coefficients 518 may be the coding coefficients $\alpha_{i,j}$ for either the SNC or the PNC coding schemes. The qualitative payload 520 includes the coded chunks.

Figure 6:
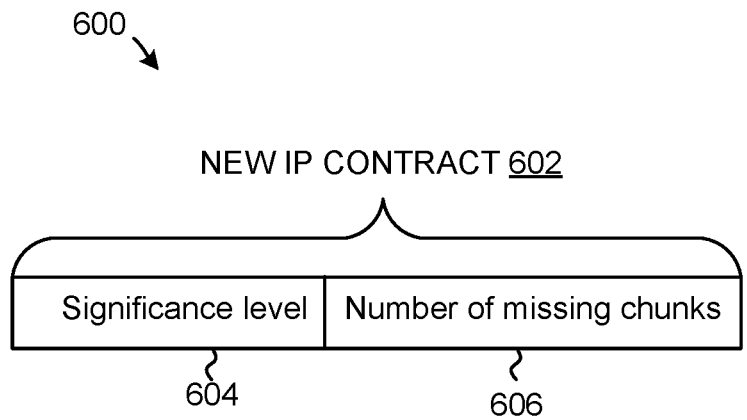
FIG. 6 is a schematic diagram that illustrates an acknowledgement data packet in accordance with an embodiment of the disclosure.

FIG. 6 is a schematic diagram that illustrates a portion of an acknowledgement data packet 600 sent by a destination node in accordance with an embodiment of the disclosure. In an embodiment, the acknowledgement data packet 600 may request that the source node send additional coded chunks based on the information in the acknowledgement data packet 600. The destination node may be the destination node 106 in FIG. 3. In an embodiment, the acknowledgement data packet 600 includes new IP contract block 602. In embodiments, the acknowledgement data packet 600 may be sent after the destination node receives an encoded data packet. In another embodiment, the acknowledgement data packet 600 may be sent after the destination node receives a packet-washed data packet. In the depicted embodiment, the new IP contract block 602 includes one or more significance level fields 604 and one or more number of missing chunks fields 606. The significance level field 604 indicates the significance level of coded chunks removed/dropped from the encoded data packet to obtain the packet-washed data packet received by the destination node. The number of missing chunks field 606 indicates the number of coded chunks that were removed from that significance level during packet wash before being received by the destination node (missing "degrees of freedom" for the significance level). The source node (for example, source node 104 in FIG. 3) can then use this information to determine the significance level of the source chunks that are to be encoded and the number of resulting coded chunks to be sent to the destination node (for example, destination node 106) in a subsequent encoded data packet.

Figure 7:
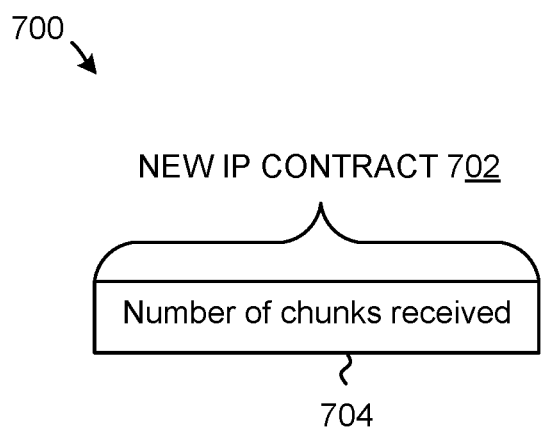
FIG. 7 is a schematic diagram that illustrates data inside an acknowledgement data packet in accordance with an embodiment of the disclosure.

FIG. 7 is a schematic diagram that illustrates a portion of an acknowledgement data packet 700 that is sent from a destination node in accordance with an embodiment of the disclosure. In an embodiment, the acknowledgement data packet 700 may request the source node to send additional coded chunks based on the information in the acknowledgement data packet 700. The destination node may be the destination node 106 in FIG. 3. In an embodiment, the acknowledgement data packet 700 includes a new IP contract block 702. In embodiments, the acknowledgement data packet 700 may be sent after the destination node receives an encoded data packet. In another embodiment, the acknowledgement data packet 700 may be sent after the destination node receives a packet-washed data packet. In the depicted embodiment, the new IP contract block 702 includes a number of coded chunks field 704. The number of coded chunks field 704 indicates a number of coded chunks received by the destination node. By inference, the source node (for example, source node 104 in FIG. 3) can use this information to determine how many coded chunks were missing or dropped. Similarly, the source node can assume that the lowest significance level coded chunks were dropped, and thus can determine which source chunks need to be encoded and transmitted to the destination node in order to decode all of the required data.

Figure 8:
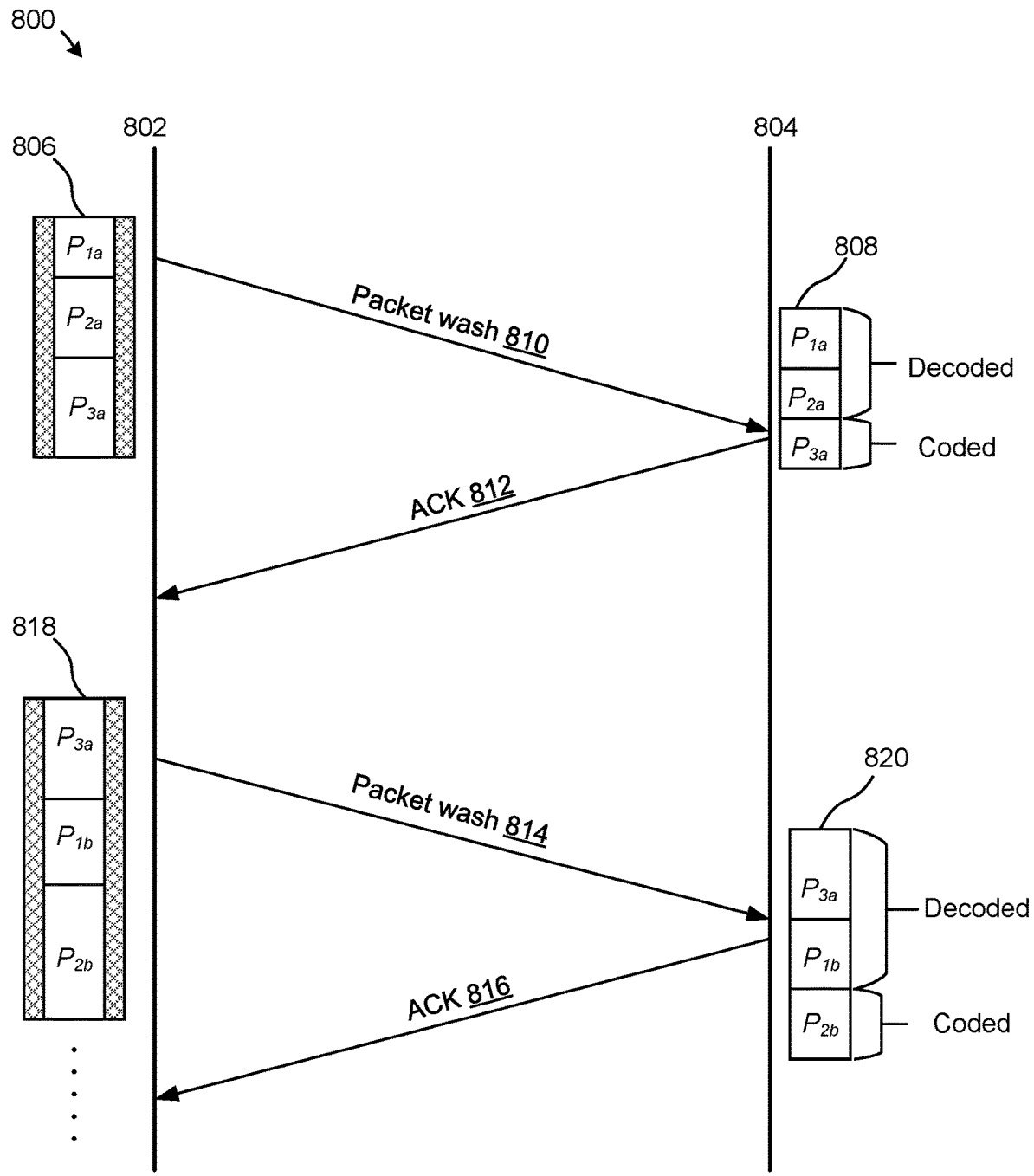
FIG. 8 is a timing diagram that illustrates a method for implementing a sliding window transmission between a source node and a destination node in accordance with an embodiment of the disclosure.

FIG. 8 is a timing diagram 800 that illustrates an embodiment of a method for implementing a sliding window transmission between a source node and a destination node of the disclosure. The method makes efficient use of packet payload space and improves throughput after an intermediate node performs packet wash on an encoded data packet. Using the method in timing diagram 800, source chunks within a significance level of the undecoded chunks in a packet-washed data packet are encoded in a sliding window. The encoded source chunks are used to make up for the chunk shortage at the destination node. The encoded source chunks are transmitted as replacement coded chunks within the same significance level as the undecoded chunks in a subsequent encoded data packet. Further, the encoded source chunks as replacement chunks in the subsequent encoded data packet may be transmitted by the source node 802 without the source node 802 having to retransmit the entire encoded data packet during network congestion or packet error, thereby efficiently using a packet payload for each data transmission and maximizing throughput in transmitting data packets.

As shown in FIG. 8, a source node 802 applies adaptive network coding to source chunks of a data packet payload to encode the source chunks inside of an encoded data packet 806. The source node 802 may be the source node 104 (FIG. 3). Also, encoded data packet 806 may be the encoded data packet 202 (FIG. 3). As illustrated, the encoded data packet 806 includes coded chunks with significance levels $P_{1a}$, $P_{2a}$, and $P_{3a}$, with $P_{1a}$ being the most significant level. The coded chunks are encoded in the payload of the encoded data packet 806. The encoded data packet 806 is transmitted by the source node 802 over a network to a destination node 804. Encoding source chunks into coded chunks in the payload of the encoded data packet 806 allows the encoded data packet 806 to have a relatively consistent size.

During transmission of the encoded data packet 806 through a network, an intermediate node performs packet wash on the encoded data packet 806 to obtain a packet-washed data packet 808. During packet wash, one or more coded chunks of the encoded data packet 806 are dropped to create a packet-washed data packet 806. To illustrate, the intermediate node performs a packet wash 810 on the encoded data packet 806 and may drop one or more coded chunks in significance level $P_{3a}$. Thus, with packet wash, the qualitative communication scheme ensures that the entire payload is not dropped, which prevents retransmission of the encoded data packet 806.

When the packet-washed data packet 808 reaches the destination node 804, the destination node 804 may determine whether one or more coded chunks are missing in significance level $P_{3a}$ of the packet-washed data packet 806.

Destination node 804 may be the destination node 106 (FIG. 3). In an embodiment, the destination node 804 determines whether a packet wash 810 was performed on the encoded data packet 806. The destination node 804 may send an acknowledgement packet 812 back to the source node 802 when determining that one or more coded chunks in a significance level were dropped during transmission. The acknowledgement packet 812 may include a new IP contract block. In embodiments, the new IP contract block may be new IP contract block 602 or new IP contract block 702.

In embodiments, when the source node 802 receives the acknowledgement packet 812, the source node 802 may be able to determine what are the missing coded chunks using the data from the IP contract block. More particularly, the source node 802 may be able to determine how many coded chunks were missing at each significance level, even if it does not know which specific chunks were lost. In an embodiment, the source node 802 may transmit a subsequent encoded data packet 818. In an embodiment, the subsequent encoded data packet 818 is encoded using adaptive network coding with a sliding window to transmit the missing source chunks $C_1, C_2, C_3, \ldots, C_N$ of FIG. 3 as replacement coded chunks at the significance levels of the undecoded chunks that were not decodable by the destination node 804. In the subsequent encoded data packet 818 in an embodiment, the sliding window encodes missing source chunks at the significance level $P_{3a}$ of the coded chunks in the packet-washed data packet 808. The sliding window can also encode new source chunks at the significance levels $P_{1b}$, $P_{2b}$. The missing source chunks at the significance level $P_{3a}$ are encoded as replacement coded chunks in the subsequent encoded data packet 818 and are transmitted as the most significant coded chunks that are arranged in the front of the payload (for example, left-most data of the payload). The replacement coded chunks, being the left-most data of the payload, are the most significant coded chunks in the subsequent encoded data packet 818. In conventional networks, missing source chunks may be sent using replacement data packets, which reduce the bandwidth and throughput of the network. Using a sliding window with the qualitative communication technique enables missing source chunks to be sent with new source chunks within a consistently sized encoded data packet so that missing source chunks are not encoded using an entire encoded data packet, which efficiently uses a data packet and maximized bandwidth and throughput.

As shown in FIG. 8, the subsequent encoded data packet 818 is transmitted to the destination node 804. An intermediate node may packet wash 814 the subsequent encoded data packet 818 during a network condition to drop coded chunks. In an example, during packet wash 814, an intermediate node drops coded data packet at significance level $P_{2b}$. The destination node 804 may send another acknowledgement packet 816 back to the source node 802 when determining that one or more coded chunks in the packet-washed data packet 820 were dropped during transmission. A sliding window may be used in another subsequent encoded data packet to send missing source chunks of the packet-washed data packet 820 with new coded chunks, as discussed above. The process of receiving a packet-washed data packet by the destination node, sending an acknowledgement data packet, and receiving a subsequent encoded data packet that encodes source chunks in a sliding window may be repeated as described above in FIG. 8. Conventional methods of transmitting missing coded chunks use separate data packets, which may create a larger number of smaller data packets. As each data packet has an overhead, sending a larger number of small packets is less efficient than sending a smaller number of large packets with the same total payload. Thus, using a sliding window may enable transmission of a relatively consistent encoded data packet from a source node. The benefits of packet transmission using a sliding window include efficiently using a packet payload of a data packet to retransmit missing source chunks with new source chunks thereby maximizing throughput in transmitting data packets in wired and wireless networks.

Figure 9:
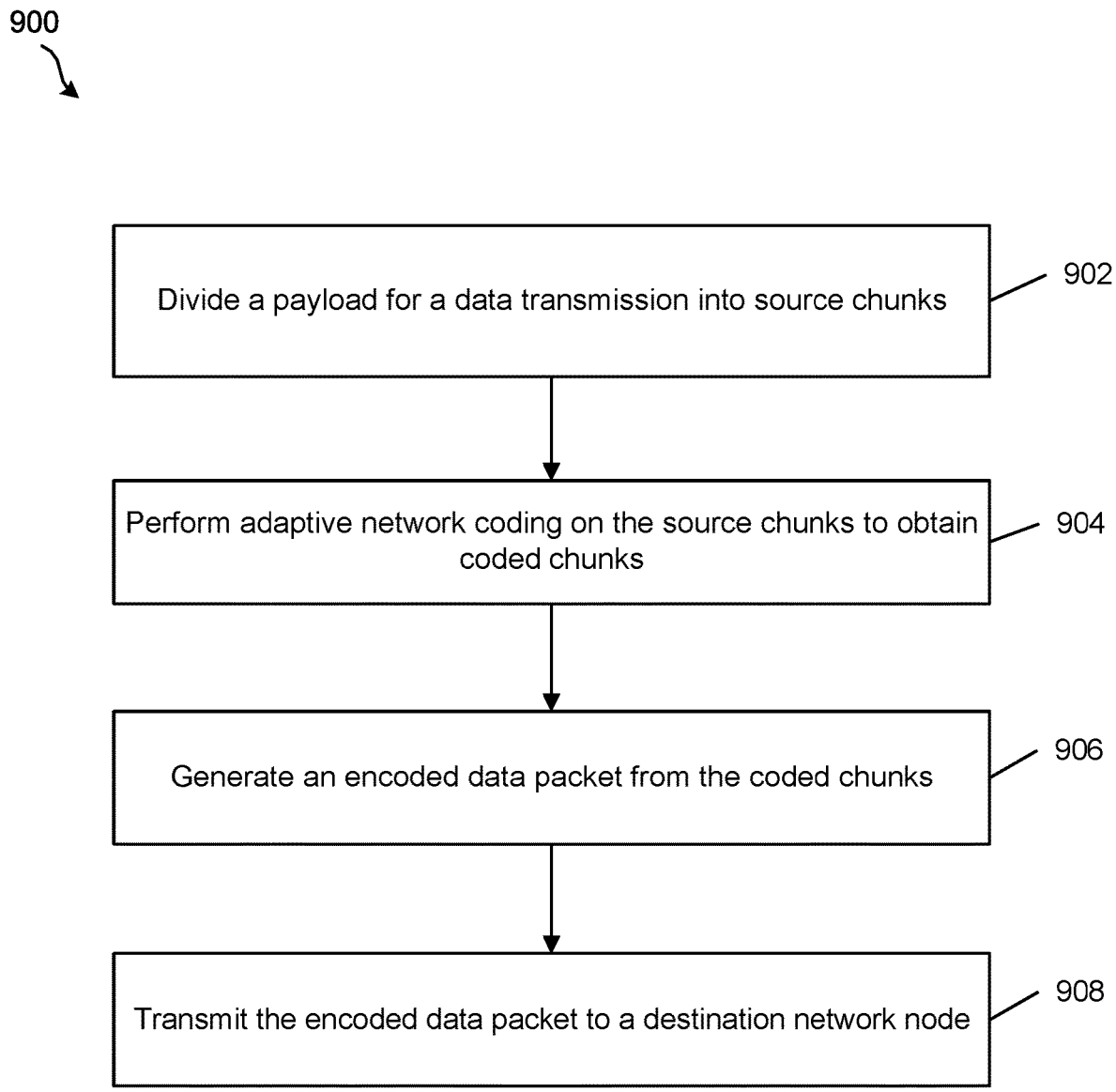
FIG. 9 is a method for implementing qualitative communication by a source node according to various embodiments of the disclosure.

FIG. 9 is a method 900 implemented by a network node for qualitative communications using adaptive network coding with a sliding window in accordance with various embodiments of the disclosure. In an embodiment, the method 900 may be performed by a source node 104 in FIGS. 1-3. The method 900 provides a qualitative communication technique using adaptive network coding with a sliding window. Using adaptive network coding with a sliding window, a source node may encode source chunks with coding coefficients according to the significance levels of the source chunks that may prevent an intermediate node from dropping the entire data packet during a packet wash when a network condition is detected. Including the benefits mentioned herein in the disclosure, additional benefits of using adaptive network coding with a sliding window include a coding scheme where an intermediate node may easily perform packet wash without having to make a determination as to which coded chunks to drop. Therefore, as a practical matter, the qualitative communication technique improves the performance of network nodes in the network and the overall network, which leads to a better user experience when data is transmitted in a network.

At step 902, the source node may divide a payload for a data transmission into a plurality of source chunks. In embodiments, each source chunk may have a significance level. In embodiments, one or more of the source chunks may have the same significance level or a different significance level.

At step 904, the source node may perform adaptive network coding on the source chunks to obtain coded chunks. In embodiments, the source network may obtain a significance level of the plurality of source chunks and perform adaptive network coding on the source chunks according to the significance levels of the plurality of source chunks to obtain coded chunks. The coded chunks may have a plurality of coding groups. Each coding group may include at least one coded chunk having the same significance level. The significance level in at least two of the plurality of coding groups is different.

At step 906, the source node generates an encoded data packet with a header and a payload. The payload includes the coded chunks. In an embodiment, the encoded data packet includes a new IP contract block. In an embodiment, the order of coded chunks in the payload of the encoded data packet may be in a different order or significance than the order of significance of the source chunks. In an embodiment, the new IP contract block may provide information on the semantics of the payload.

At step 908, the source node transmits the encoded data packet to the destination node in the network.

Figure 10:
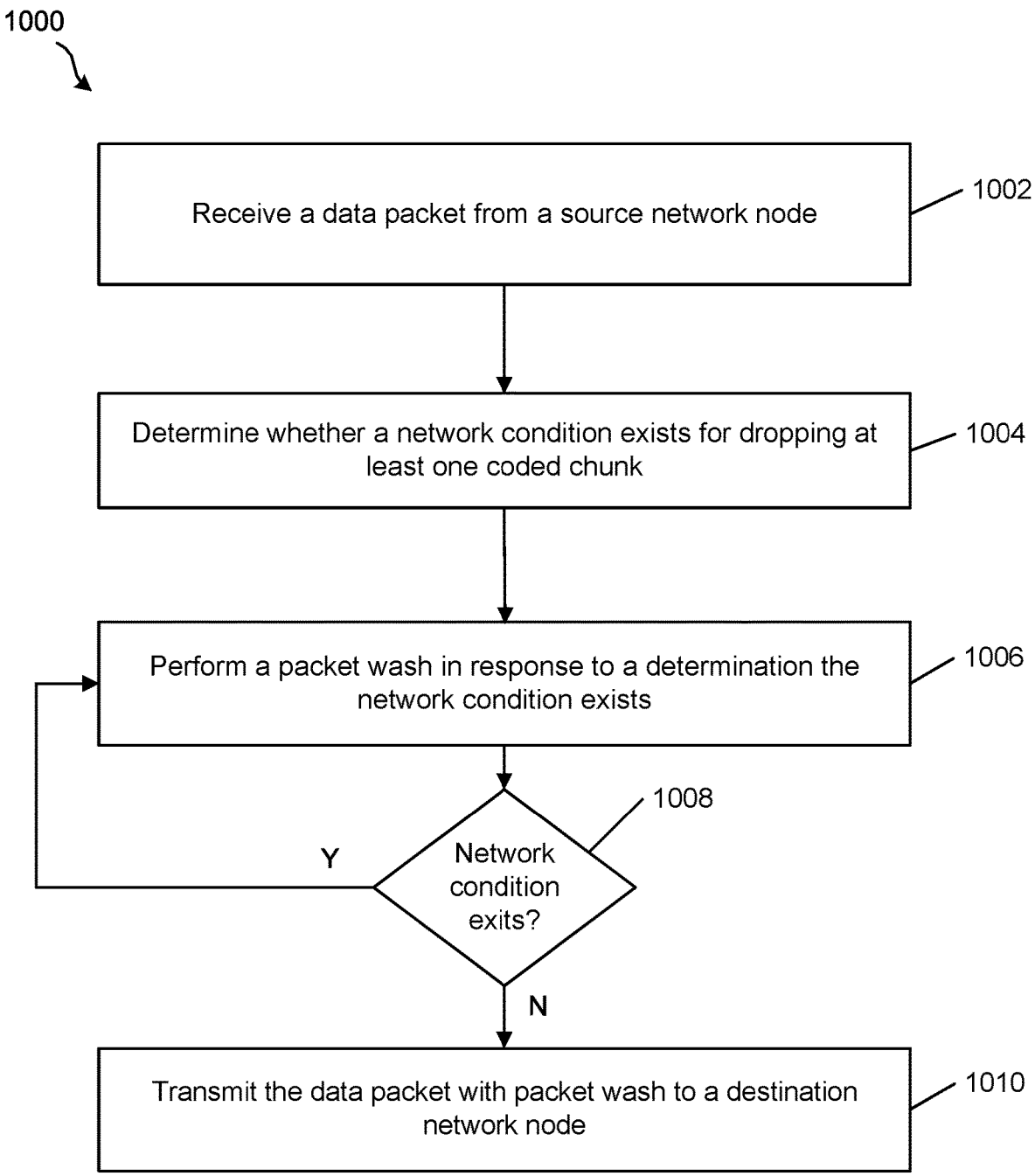
FIG. 10 is a method for implementing qualitative communication by an intermediate node according to various embodiments of the disclosure.

FIG. 10 is an embodiment of a method 1000 implemented by a network node for qualitative communications using adaptive network coding with a sliding window in accordance with various embodiments of the disclosure. In an embodiment, the method 1000 may be performed by an intermediate node 110B in FIGS. 1-3. The method 1000 provides a qualitative communication technique using adaptive network coding with a sliding window. Using adaptive network coding with a sliding window, an intermediate node performs a packet wash when a network condition is detected and selectively drops parts of the data packet so as to reduce the packet size. Including the benefits mentioned in the disclosure, additional benefits of using adaptive network coding with a sliding window include that the intermediate node does not have to make a determination as to which coded chunks to drop. Therefore, as a practical matter, the qualitative communication technique improves the performance of network nodes in the network and the overall network, which leads to a better user experience when data is transmitted in a network.

At step 1002, the intermediate node receives a data packet from a source node. In embodiments, the data packet is an encoded data packet that includes coded chunks. The coded chunks are in a plurality of coding groups, wherein each coding group comprises a different significance level.

At step 1004, the intermediate node determines whether a network condition in the network exists for dropping at least one coded chunk in the data packet. In embodiments, the network condition may be network congestion at the intermediate node or packet corruption of one or more coded chunks in the data packet.

At step 1006, the intermediate node performs a packet wash in response to a determination that the network condition exists. The packet wash reduces the payload of the data packet to obtain a packet-washed data packet. In embodiments, the coded chunks in the data packet are prioritized by significance level. During a packet wash, coded chunks in lower significance coding groups are removed before coded chunks in higher significance coding groups are removed.

At step 1008, the intermediate node further determines whether the network condition still exists that requires dropping additional portions of the packet-washed data packet after the packet wash is performed at step 1006. If the network condition exists (step 1008="Y"), then additional coded chunks in lower priority coding groups are removed in a packet wash before coded chunks in higher priority coding groups are removed. In an embodiment, coded chunks within a significance level are removed until there are no additional coded chunks to drop within the significance level or the network condition does not exist. However, if the network condition does not exist (step 1008="N"), then at step 1010, the intermediate node forwards the packet-washed data packet to the destination node.

Figure 11:
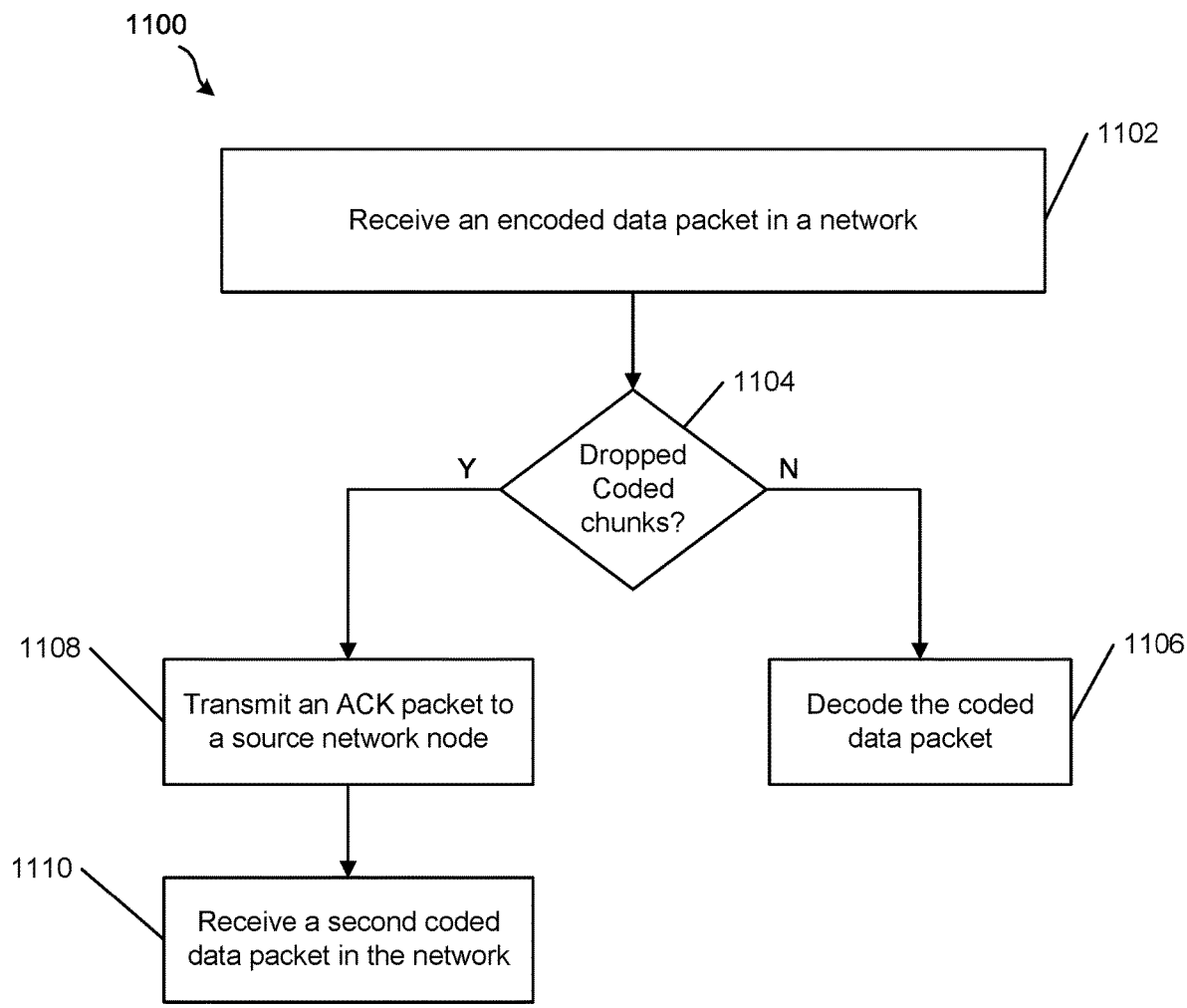
FIG. 11 is a method for implementing qualitative communication by a destination node according to various embodiments of the disclosure.

FIG. 11 is an embodiment of a method 1100 implemented by a network node for qualitative communications using adaptive network coding with a sliding window in accordance with various embodiments of the disclosure. In an embodiment, the method 1100 may be performed by a destination node 106 in FIGS. 1-3. The method 1100 provides a qualitative communication technique using adaptive network coding with a sliding window where a data packet is received at the destination node. The destination node may send an acknowledgment message to the source node when the data packet is received at the destination node. The acknowledgement packet may be sent in response to determining missing coded chunks in the data packet after a packet wash. Including the benefits mentioned in the disclosure, additional benefits using adaptive network coding with a sliding window include that a destination node may decode the most significant coded chunks after a packet wash has been performed and the acknowledgement packet provides information that indicates to the source node the missing chunks that are to be coded and transmitted without transmitting all the coded source chunks. Therefore, as a practical matter, the qualitative communication technique improves the performance of network nodes in the network and the overall network, which leads to a better user experience when data is transmitted in a network.

At step 1102, the destination node may receive an encoded data packet. The encoded data packet is received from a source node via an intermediate node. In an embodiment, the encoded data packet is data packet 206 (FIG. 3). The encoded data packet includes a header, a new IP contract block, and a payload. In embodiments, the new IP contract block includes information about the coded chunks in the payload. The payload includes the coded chunks. The payload may include coding coefficients or the new IP contract block may include coding coefficients. The coding coefficients may be used to decode the coded chunks in the encoded data packet.

At step 1104, the destination node may determine whether coded chunks were dropped in the encoded data packet during transmission from the source node. For instance, a packet corruption or network congestion may cause one or more coded chunks to be dropped during packet wash.

If coded chunks were not dropped in the encoded data packet during transmission from the source node (step 1104="N"), then at step 1106, the destination node may decode the encoded data packet. In embodiments, the destination node may decode the encoded data packet using the coding coefficients in the encoded data packet and the coded chunks in the encoded data packet. In an embodiment, the destination node may transmit an acknowledgement packet to the source node requesting additional data packets.

If coded chunks were dropped in the encoded data packet during transmission from the source node (step 1104="Y"), then at step 1108, the destination node may transmit an acknowledgement packet to the source node. In an embodiment, the acknowledgement packet includes a new IP contract block. In embodiments, the new IP contract block may be new IP contract block 602 (FIG. 6) or new IP contract block 702 (FIG. 7). In another embodiment, the acknowledgement packet may include information that is provided in other formats and need not be provided in a new IP contract block. In an embodiment, the destination node may be able to decode the encoded data packet after a packet wash using the coding coefficients in order to retrieve one or more of the original source chunks. For instance, the destination node may only require coded chunks in the most significant coding groups to obtain one or more of the original source chunks. In other embodiments, the destination node may decode coded chunks in a coding group that included redundant coded chunks that were dropped during packet wash.

At step 1110, the destination node may receive a second encoded data packet in the network. In embodiments, the second encoded data packet is received from a source node. The source node may be the source node 104. In an embodiment, the source node may transmit the missing source chunks as coded chunks at the significance level of the undecoded chunks in a payload of a subsequent encoded data packet with a sliding window. The subsequent encoded data packet may encode the missing source chunks together with new source chunks in the second encoded data packet.

Figure 12:
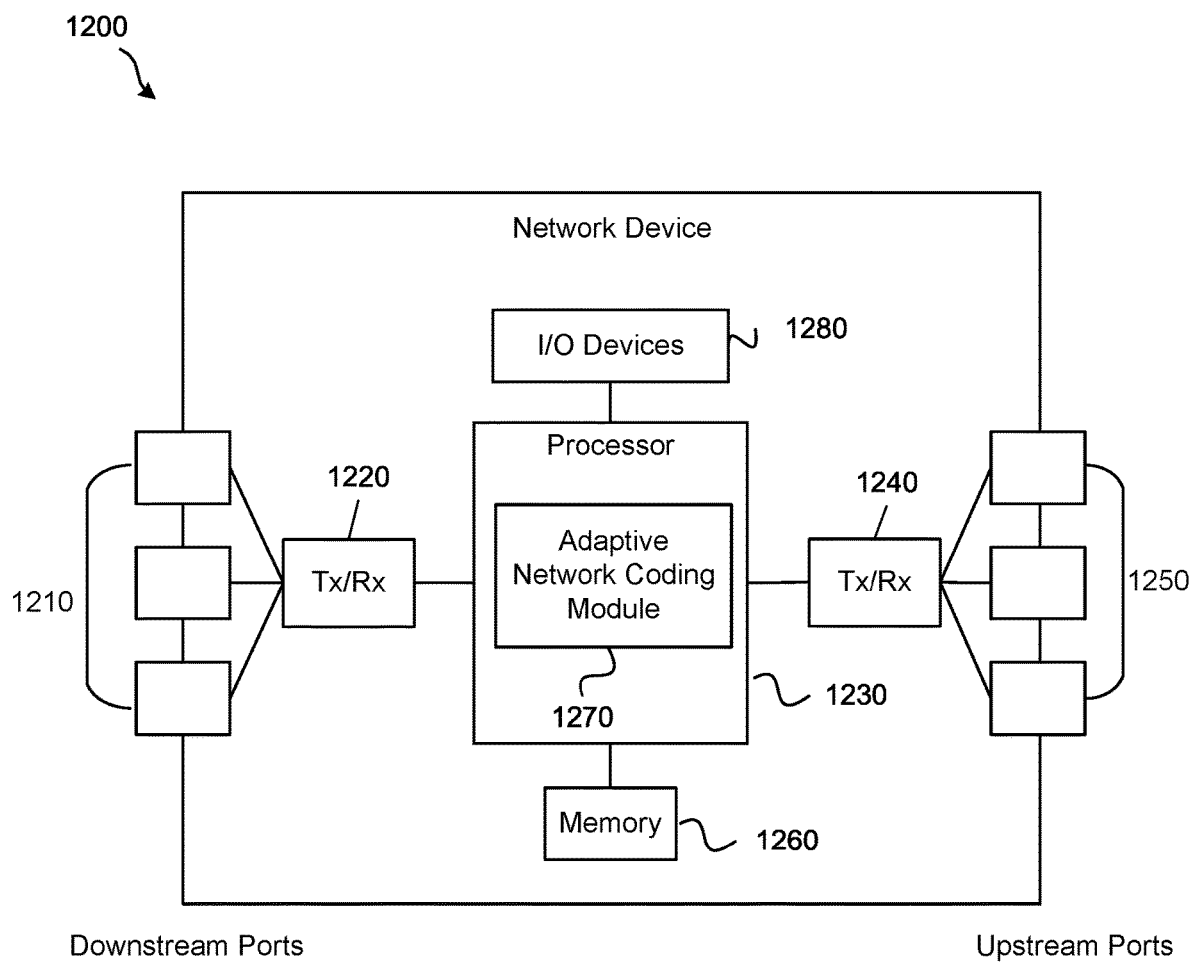
FIG. 12 is a schematic diagram of a network device according to various embodiments of the disclosure.

FIG. 12 is a schematic diagram of a network device 1200 in the network 100 according to various embodiments of the disclosure. In embodiments, network device 1200 may be implemented as any one of network nodes 104, 110A, 110B, 110C, and 106. Network Device 1200 is suitable for implementing the disclosed embodiments as described herein. The network device 1200 comprises ingress ports 1210 and receiver units (Rx) 1220 for receiving data; a processor, logic unit, or central processing unit (CPU) 1230 to process the data; transmitter units (Tx) 1240 and egress ports 1250 for transmitting the data; and a memory 1260 for storing the data. The network device 1200 may also comprise optical-to-electrical (OE) components and electrical-to-optical (EO) components coupled to the ingress ports 1210, the receiver units 1220, the transmitter units 1240, and the egress ports 1250 for egress or ingress of optical or electrical signals.

The processor 1230 is implemented by hardware and software. The processor 230 may be implemented as one or more central processing unit (CPU) and/or graphics processing unit (GPU) chips, logic units, cores (e.g., as a multi-core processor), field-programmable gate arrays (FPGAs), application specific integrated circuits (ASICs), and digital signal processors (DSPs). The processor 1230 is in communication with the ingress ports 1210, receiver units 1220, transmitter units 1240, egress ports 1250, and memory 1260. The processor 1230 comprises an adaptive network coding module 1270. The adaptive network coding module 1270 is implemented by the processor 1230 to execute the steps of methods 900-1100 and instructions for implementing various embodiments described herein. For instance, the adaptive network coding module 1270 implements, processes, prepares, or provides the various routing and forwarding functions. The inclusion of the adaptive network coding module 1270 therefore provides a substantial improvement to the functionality of the network device 1200 and effects a transformation of the network device 1200 to a different state. Alternatively, the adaptive network coding module 1270 is implemented as instructions stored in the memory 1260 and executed by the processor 1230. In embodiments, the network device 1200 is a non-transitory computer-readable medium configured to store a computer program product comprising computer executable instructions that, when executed by the processor 1230, cause the processor 1230 to implement the steps of method 300. For example, the adaptive network coding module 1270 is configured to forward the data packet 202 on a path in network 100. The inclusion of the data packet 202 also provides an improvement to the functionality of the network device 1200 and other devices in network 100 by minimizing the transmission overhead while ensuring that the receiving and decoding of most significant chunks are not affected by the dropped chunks due to packet wash in the network. The adaptive network coding module 1270 also effects a transformation of network device 1200 to a different state. Alternatively, the adaptive network coding module 1270 is implemented as instructions stored in the memory 1260.

The network device 1200 may also include input and/or output (I/O) devices 1280 for communicating data to and from a user. The I/O devices 1280 may include output devices such as a display for displaying video data, speakers for outputting audio data, etc. The I/O devices 1280 may also include input devices, such as a keyboard, mouse, trackball, etc., and/or corresponding interfaces for interacting with such output devices.

The memory 1260 comprises one or more of disks, tape drives, and solid-state drives and may be used as an over-flow data storage device, to store programs when such programs are selected for execution, and to store instructions and data that are read during program execution. The memory 1260 may be volatile and/or non-volatile and may be read-only memory (ROM), random access memory (RAM), ternary content-addressable memory (TCAM), and/or static random-access memory (SRAM).

The processor 1230 may be implemented by hardware and software. The processor 1230 may be implemented as one or more central processing unit (CPU) and/or graphics processing unit (GPU) chips, logic units, cores (e.g., as a multi-core processor), field-programmable gate arrays (FPGAs), application specific integrated circuits (ASICs), and digital signal processors (DSPs). The processor 1230 is in communication with the ports 1220, Tx/Rx 1210, and memory 1260. The adaptive network coding module 1270 is implemented by the processor 1230 to execute the steps of methods 900, 1000, and 1100 and the instructions for implementing various embodiments discussed herein. In embodiments, the network device 1200 is a non-transitory computer-readable medium configured to store a computer program product comprising computer executable instructions that, when executed by the processor 1230, cause the processor to implement the steps of methods 900-1100. For example, the adaptive network coding module 1270 is configured to perform a packet wash to a coded packet 202 using data in the coded packet 202. The inclusion of the adaptive network coding module 1270 provides an improvement to the functionality of the network device 1200. The adaptive network coding module 1270 also effects a transformation of network device 1200 to a different state. Alternatively, the adaptive network coding module 1270 is implemented as instructions stored in the memory 1260.

The memory 1260 comprises one or more of disks, tape drives, or solid-state drives and may be used as an over-flow data storage device, to store programs when such programs are selected for execution, and to store instructions and data that are read during program execution. The memory 1260 may be volatile and non-volatile and may be read-only memory (ROM), random-access memory (RAM), ternary content-addressable memory (TCAM), and static random-access memory (SRAM).

It is understood that by programming and/or loading executable instructions onto the network device 1200, at least one of the processor 1230 and/or memory 1260 are changed, transforming the network device 1200 in part into a particular machine or apparatus, e.g., a multi-core forwarding architecture, having the novel functionality taught by the disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an ASIC, because for large production runs the hardware implementation may be less expensive than the software implementation. Often a design may be developed and tested in a software form and later transformed, by well-known design rules, to an equivalent hardware implementation in an ASIC that hardwires the instructions of the software. In the same manner as a machine controlled by a new ASIC is a particular machine or apparatus, likewise a computer that has been programmed and/or loaded with executable instructions may be viewed as a particular machine or apparatus.

Figure 13:
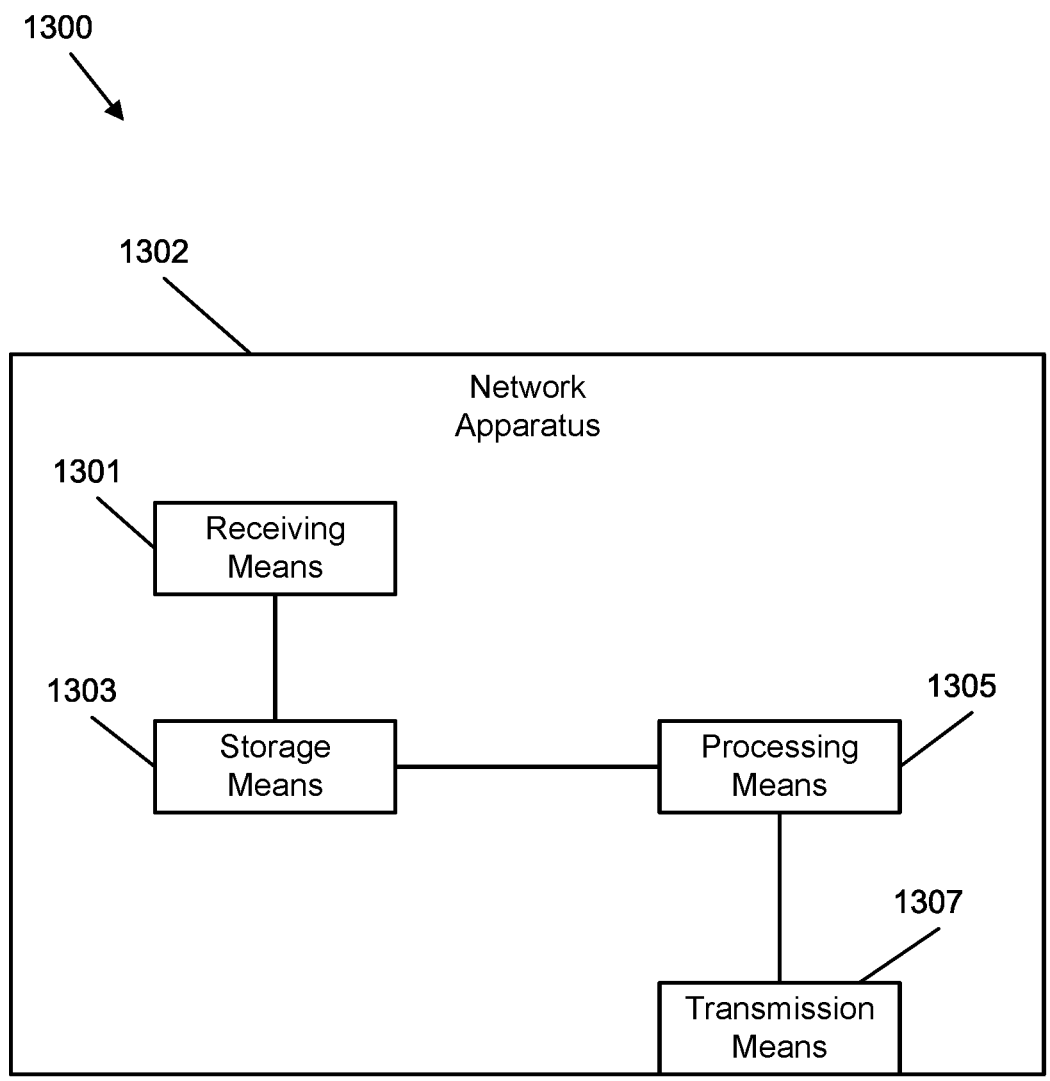
FIG. 13 is a schematic diagram illustrating a means for qualitative communication according to various embodiments of the disclosure

FIG. 13 is a schematic diagram of embodiments of a means for qualitative communication 1300 in a network in accordance with various embodiments of the disclosure. In embodiments, the means for qualitative communication 1300 is implemented in a network apparatus 1302 (e.g., network nodes 104, 110A, 110B, 110C, and 106). The network apparatus 1302 includes receiving means 1301. The receiving means 1301 is configured to receive a data packet or to receive a data stream to route to a destination network element. The network apparatus 1302 includes transmission means 1307 coupled to the receiving means 1301. The transmission means 1307 is configured to transmit or forward the data packet or data stream to another network element.

The network apparatus 1302 includes a storage means 1303. The storage means 1303 is coupled to at least one of the receiving means 1301 or the transmission means 1307. The storage means 1303 is configured to store instructions. The network apparatus 1302 also includes processing means 1305. The processing means 1305 is coupled to the storage means 1303. The processing means 1305 is configured to execute the instructions stored in the storage means 1303 to perform the methods disclosed herein.

While several embodiments have been provided in the disclosure, it should be understood that the disclosed systems and methods might be embodied in many other specific forms without departing from the spirit or scope of the disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method performed by a source node in a network, the method comprising:
dividing a payload for a data transmission into a plurality of source chunks, each source chunk of the plurality of source chunks comprising a first significance level;
performing, according to the first significance level of each source chunk of the plurality of source chunks, adaptive network coding on each source chunk of the plurality of source chunks to obtain a plurality of coded chunks in a plurality of coding groups, a second significance level of the plurality of coded chunks in at least two of the plurality of coding groups being different, and each coding group of the plurality of coding groups comprising at least one coded chunk having a same significance level;
generating a first coded data packet comprising a header and a second payload, the second payload comprising the plurality of coded chunks, and the first coded data packet comprising a number of coded chunks in each significance level field that indicates a quantity of coded chunks in the payload having the same significance level; and
transmitting the first coded data packet to a destination node.

2. The method of claim 1, further comprising:
obtaining a second plurality of source chunks from the plurality of source chunks that have a same significance level; and
encoding the second plurality of source chunks, together, into the plurality of coded chunks.

3. The method of claim 2, further comprising:
performing progressive network coding on the second plurality of source chunks in a descending order of a third significance level of each of the second plurality of source chunks; or
performing stacked network coding on each of the second plurality of source chunks to separately encode each of the second plurality of source chunks into a coding group according to the same significance level.

4. The method of claim 1, further comprising receiving, from the destination node, an acknowledgement packet corresponding to the first coded data packet, wherein the acknowledgement packet comprises one or more of:
an Internet Protocol (IP) contract field;
a field indicating a second number of coded chunks from the plurality of coded chunks that are missing at the destination node from the first coded data packet and a second significance level field indicating a third significance level for the second number of coded chunks missing from the first coded data packet; and
a received number of chunks field indicating a third number of coded chunks from the plurality of coded chunks received at the destination node.

5. The method of claim 4, further comprising:
performing, according to a fourth significance level of a second plurality of source chunks, the adaptive network coding on the second plurality of source chunks to obtain a second plurality of coded chunks responsive to receiving the acknowledgement packet, the fourth significance level of the second plurality of source chunks being the same significance level of coded chunks that are missing at the destination node from the first coded data packet;
generating a second coded data packet comprising a third payload comprising the second plurality of coded chunks and at least one second coded chunk from a new coding group; and
transmitting, to the destination node, the second coded data packet.

6. The method of claim 1, wherein the plurality of coding groups are arranged from highest significance level to lowest significance level.

7. The method of claim 1, further comprising performing the adaptive network coding on the plurality of source chunks within the first significance level to obtain one or more redundant coded chunks.

8. A source node in a network, comprising:
a memory storing instructions;
at least one processor in communication with the memory, the at least one processor configured, upon execution of the instructions, to cause the source node to perform the following steps:
divide a payload for a data transmission into a plurality of source chunks, each source chunk of the plurality of source chunks comprising a first significance level;

perform, according to the first significance level of each of the plurality of source chunks, adaptive network coding on each of the plurality of source chunks to obtain a plurality of coded chunks in a plurality of coding groups, a second significance level of the plurality of coded chunks in at least two of the plurality of coding groups being different, and each coding group of the plurality of coding groups comprising at least one coded chunk having a same significance level;

generate a first coded data packet comprising a header and a second payload comprising the plurality of coded chunks, the first coded data packet comprising a number of coded chunks in each significance level field that indicates a quantity of coded chunks in the payload having the same significance level; and transmit the first coded data packet to a destination node.

9. The source node of claim 8, wherein the at least one processor further executes the instructions to cause the source node to:

obtain a second plurality of source chunks from the plurality of source chunks that have a same significance level; and encode the second plurality of source chunks, together, into the plurality of coded chunks.

10. The source node of claim 9, wherein the at least one processor further executes the instructions to cause the source node to:

perform progressive network coding on the second plurality of source chunks in a descending order of a third significance level of each of the plurality of source chunks in the second plurality of source chunks; or perform stacked network coding on source chunks in the second plurality of source chunks to separately encode each of the second plurality of source chunks into a coding group according to the same significance level.

11. The source node of claim 8, wherein the at least one processor further executes the instructions to cause the source node to receive, from the destination node, an acknowledgement packet corresponding to the first coded data packet, wherein the acknowledgement packet comprises one or more of:

an Internet Protocol (IP) contract field;

a field indicating a second number of coded chunks from the plurality of coded chunks missing from the first coded data packet and a second significance level field indicating a third significance level for the second number of coded chunks missing from the first coded data packet; and a third number of coded chunks in each significance level field that indicates a quantity of coded chunks in the second payload having the same significance level.

12. The source node of claim 11, wherein the at least one processor further executes the instructions to cause the source node to:

perform, according to a fourth significance level of a second plurality of source chunks, the adaptive network coding on the second plurality of source chunks to obtain a second plurality of coded chunks responsive to receiving the acknowledgement packet, the fourth significance level of the second plurality of source chunks being the same significance level of coded chunks that are missing at the destination node from the first coded data packet;

generate a second coded data packet comprising a second third payload comprising the second plurality of coded chunks and at least one second coded chunk from a new coding group; and transmit, to the destination node, the second coded data packet.

13. The source node of claim 8, wherein the plurality of coding groups are arranged from highest significance level to lowest significance level.

14. The source node of claim 8, wherein the at least one processor further executes the instructions to cause the source node to perform the adaptive network coding on at least one additional source chunk in the first significance level to obtain one or more redundant coded chunks.

15. A system in a network, comprising:

a first network node, comprising:

a memory storing instructions; and at least one processor in communication with the memory, the at least one processor configured, upon execution of the instructions, to cause the first network node to perform the following steps:

divide a payload for a data transmission into a plurality of source chunks, each source chunk of the plurality of source chunks comprising a first significance level;

perform, according to the first significance level of each source chunk of the plurality of source chunks, adaptive network coding on each source chunk of the plurality of source chunks to obtain a plurality of coded chunks in a plurality of coding groups, a second significance level of the plurality of coded chunks in at least two of the plurality of coding groups being different, and each coding group of the plurality of coding groups comprising at least one coded chunk having a same significance level;

generate a first coded data packet comprising a header and a second payload comprising the plurality of coded chunks, the first coded data packet comprising a number of coded chunks in each significance level field that indicates a quantity of coded chunks in the payload having the same significance level; and transmit the first coded data packet to a destination node; and a second network node communicatively coupled to the first network node and configured to receive the first coded data packet.

16. The system of claim 15, wherein the at least one processor further executes the instructions to cause the first network node to:

obtain a second plurality of source chunks from the plurality of source chunks that have a same significance level; and encode the second plurality of source chunks, together, into the plurality of coded chunks.

17. The system of claim 16, wherein the at least one processor further executes the instructions to cause the first network node to:

perform progressive network coding on the second plurality of source chunks in a descending order of a third significance level of each of the plurality of source chunks in the second plurality of source chunks; or perform stacked network coding on source chunks in the second plurality of source chunks to separately encode each of the second plurality of source chunks into a coding group according to the same significance level.

18. The system of claim 15, wherein the at least one processor further executes the instructions to cause the first network node to receive, from the second network node, an acknowledgement packet corresponding to the first coded data packet, wherein the acknowledgement packet comprises one or more of:
- an Internet Protocol (IP) contract field;
- a field indicating a second number of coded chunks from the plurality of coded chunks missing from the first coded data packet and a second significance level field indicating a third significance level for the second number of coded chunks missing from the first coded data packet; or
- a third number of coded chunks in each second significance level field that indicates a quantity of coded chunks in the payload having the same significance level.

19. The system of claim 18, wherein the at least one processor further executes the instructions to cause the first network node to:

perform, according to a fourth significance level of a second plurality of source chunks, the adaptive network coding on the second plurality of source chunks to obtain a second plurality of coded chunks responsive to receiving the acknowledgement packet, the fourth significance level of the second plurality of source chunks being a same significance level of coded chunks that are missing at the destination node from the first coded data packet;

generate a second coded data packet comprising a third payload comprising the second plurality of coded chunks and at least one second coded chunk from a new coding group; and transmit, to the destination node, the second coded data packet.

20. The system of claim 15, wherein the plurality of coding groups are arranged from highest significance level to lowest significance level.

\* \* \* \* \*

UNITED STATES PATENT AND TRADEMARK OFFICE
CERTIFICATE OF CORRECTION

| | |
|---|---|
| PATENT NO. | : 12,199,764 B2 |
| APPLICATION NO. | : 18/330142 |
| DATED | : January 14, 2025 |
| INVENTOR(S) | : Lijun Dong |

It is certified that error appears in the above-identified patent and that said Letters Patent is hereby corrected as shown below:

In the Claims

Column 29, Claim 12, Lines 55-66, through Column 30, Lines 1-6, should read:
12. The source node of claim 11, wherein the at least one processor further executes the instructions to cause the source node to:
    perform, according to a fourth significance level of a second plurality of source chunks, the adaptive network coding on the second plurality of source chunks to obtain a second plurality of coded chunks responsive to receiving the acknowledgement packet, the fourth significance level of the second plurality of source chunks being the same significance level of coded chunks that are missing at the destination node from the first coded data packet;
    generate a second coded data packet comprising a third payload comprising the second plurality of coded chunks and at least one second coded chunk from a new coding group; and
    transmit, to the destination node, the second coded data packet.

Signed and Sealed this
Fourth Day of March, 2025

Coke Morgan Stewart
*Acting Director of the United States Patent and Trademark Office*